(12) United States Patent
Hayashi et al.

(10) Patent No.: US 8,412,399 B2
(45) Date of Patent: Apr. 2, 2013

(54) ELECTRICITY GENERATION CONTROL DEVICE FOR VEHICLE

(75) Inventors: Kensuke Hayashi, Chiyoda-ku (JP); Satoshi Wachi, Chiyoda-ku (JP); Nozomu Kamioka, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 105 days.

(21) Appl. No.: 13/172,331

(22) Filed: Jun. 29, 2011

(65) Prior Publication Data
US 2012/0143418 A1 Jun. 7, 2012

(30) Foreign Application Priority Data
Dec. 1, 2010 (JP) ................................ 2010-268267

(51) Int. Cl.
*B60L 9/00* (2006.01)
(52) U.S. Cl. .................... 701/22; 180/65.285; 903/903
(58) Field of Classification Search ............... 701/22, 701/55; 180/65.265, 65.285; 903/902, 903, 903/906, 907
See application file for complete search history.

(56) References Cited

U.S. PATENT DOCUMENTS

| | | | | |
|---|---|---|---|---|
| 2005/0209760 A1* | 9/2005 | Tabata et al. | | 701/53 |
| 2008/0110684 A1* | 5/2008 | Kaita | | 180/65.2 |
| 2008/0293538 A1* | 11/2008 | Saito et al. | | 477/3 |
| 2009/0042690 A1* | 2/2009 | Tabata et al. | | 477/5 |
| 2009/0069966 A1* | 3/2009 | Tabata et al. | | 701/22 |
| 2009/0076693 A1* | 3/2009 | Kumazaki et al. | | 701/55 |
| 2010/0022346 A1* | 1/2010 | Shibata et al. | | 477/3 |
| 2011/0101778 A1* | 5/2011 | Yang | | 307/52 |
| 2011/0106356 A1* | 5/2011 | Tsuda et al. | | 701/22 |
| 2012/0072064 A1* | 3/2012 | Kumazaki et al. | | 701/22 |
| 2012/0303199 A1* | 11/2012 | Oba et al. | | 701/22 |

\* cited by examiner

*Primary Examiner* — Helal A Algahaim
(74) *Attorney, Agent, or Firm* — Sughrue Mion, PLLC

(57) ABSTRACT

An electricity generation control device calculates a virtual electricity generation efficiency where a transmission gear ratio of a continuously variable transmission is changed with a minute amount when an electricity generation condition by an engine drive is realized, changes the transmission gear ratio with a minute amount in a case where the virtual electricity generation efficiency is superior to a present electricity generation efficiency, calculates a virtual electricity generation efficiency where an engine drive torque and an electricity generation drive torque are changed with a minute amount, and changes the engine drive torque and the electricity generation drive torque in a case where the virtual electricity generation efficiency is superior to a present electricity generation efficiency, in which the minute amount change of the transmission gear ratio and the minute amount change of the engine drive torque and the electricity generation drive torque are alternatively performed.

6 Claims, 16 Drawing Sheets

ELECTRICITY GENERATION CONTROL DEVICE FOR VEHICLE

BACKGROUND OF THE INVENTION

1. Field of the Invention

The present invention relates to an electricity generation control technology in a vehicle including an electricity generator and a continuously variable transmission.

2. Background Art

Recently, an electricity generation control system of which an electricity generation amount of an electricity generator which rotates following an output shaft of an engine is variable to efficiently perform an electricity generation has been developed. In general, the electricity generation control system increases an electricity generation amount during deceleration of the vehicle to recover the kinetic energy of the vehicle as a power. However, in a case where the power is insufficient while driving, the electricity generator is driven by an engine to generate electricity for the insufficient power.

There has been suggested a technology that does not permit the electricity generation by the engine in a case where an engine efficiency obtained from an engine drive torque and an engine rotation speed does not satisfy a necessary engine efficiency, while the vehicle is driving, and permits the electricity generation by the engine in a case where the engine efficiency is higher than the necessary engine efficiency, whereby it is possible to efficiently generate electricity Patent Document 1: JP-A-2010-125877

In a device of the related art as disclosed in JP-A-2010-125877, while the vehicle is driving, in a case where the engine efficiency obtained from the engine drive torque and the engine rotation speed is excellent, the electricity generation by the engine drive while driving is permitted. However, it does not make any mention about a technology for changing the engine rotation speed for the purpose of improving the electricity generation efficiency at the time of generating electricity by the engine drive while driving.

Therefore, in the device of the related art disclosed in JP-A-2010-125877, when the electricity generation by the engine drive while driving is performed, it may be impossible to control the electricity generation so as to be performed in a state where the engine efficiency becomes best. In addition, since characteristics of an electricity generator are not considered, the electricity generation is frequently performed in a state where a relation between the fuel amount, which increases accompanied with the electricity generation, and the electricity generation amount is not best.

The above-described problems of the related art as disclosed in JP-A-2010-125877 will be described in detail by using maps illustrating an engine efficiency and an electricity generation efficiency as shown in FIGS. 16A and 16B. FIG. 16A in the lower side shows a map illustrating an engine efficiency with respect to an engine rotation speed and an engine drive torque. FIG. 16B in the upper side shows a map illustrating an electricity generation efficiency (defined as a value obtained by dividing the electricity generation amount by the fuel consumption amount) with respect to an engine rotation speed and an electricity generation drive torque.

In FIG. 16A, an engine efficiency in a case where the vehicle is driving in a normal state (constant load and constant speed) without performing the electricity generation is shown as state 1. Next, an engine efficiency in a case where an engine drive torque is added and thereby it approaches a state 2 in FIG. 16A is calculated. In a case where the engine efficiency obtained by the calculation is superior to threshold value of aimed engine efficiency, the electricity generation is permitted and a control point is transited to the state 2 to perform the electricity generation. However, in a case contrary to this, the electricity generation is not permitted. In addition, in FIG. 16A, a dotted curve illustrates an engine operation region, and the operation is not performed beyond the region. However, in the above-described control, since the engine rotation speed is not changed, it may be impossible to generate electricity in a point where the engine efficiency becomes best. In addition, in an electricity generation efficiency map shown in FIG. 16B, after it is transited from a state 1' to a state 2' and the electricity generation is performed in the state 2', but the state 2' is not a state where the electricity generation efficiency becomes best. Since the state where the engine efficiency becomes best and the state where the electricity generation efficiency becomes best are different from each other, it is preferable to consider the characteristics of the electricity generator for the best electricity generation efficiency.

As described above, in the device of the related art disclosed in JP-A-2010-125877, since a transmission gear ratio is not controlled at the time of generating electricity and the electricity generation state is determined by only the engine efficiency without considering the characteristics of the electricity generator, it may be impossible to generate electricity at a state where the electricity generation efficiency becomes best.

SUMMARY OF THE INVENTION

The present invention has been made to solve the above-described problems, and an object of the invention is to generate electricity in a state where a relation between a fuel amount, which increases accompanied with an electricity generation, and an electricity generation amount becomes best, by controlling an engine drive torque, an electricity generation drive torque and a continuously variable transmission in a case where the electricity generation is performed by the engine drive while driving.

In addition, another object of the invention is to suppress an adverse effect on drivability such as a rapid change in an engine rotation speed or the like, which is caused by a rapid change in a control state, by gradually approaching the state where the relation between the fuel amount, which increases accompanied with the electricity generation, and the electricity generation amount.

According to a first aspect of the invention, there is provided an electricity generation control device including an engine as a power source of a vehicle; a continuously variable transmission that steplessly changes the power of the engine to transmit it to drive wheels of the vehicle; an electricity generator that rotates following a drive shaft of the engine and can variably controls an electricity generation amount; an electrical storage device that is charged by the electricity generator and supplies the charged power to electrical loads of the vehicle; an engine rotation speed detecting unit that detects a rotation speed of the engine; an engine drive torque control unit that controls a drive torque value of the engine; an electricity generator rotation speed detecting unit that detects a rotation speed of the electricity generator; an electricity generation drive torque control unit that control a drive torque value of the electricity generator; a fuel consumption amount calculating unit that calculates a fuel consumption amount from values of the engine rotation speed and the engine drive torque; an electricity generation amount calculating unit that calculates an electricity generation amount of the electricity generator from values of the electricity generator rotation speed and the electricity generation drive torque; a transmission gear ratio changing unit that, at a time of virtually changing a transmission gear ratio of the continuously variable transmission with a minute amount, calculates a virtual engine drive torque and a virtual engine rotation speed to maintain a present speed and a present driving force of the vehicle, calculates a virtual electricity generation efficiency from a virtual fuel consumption amount calculated from the virtual engine drive torque and the virtual engine rotation speed by the fuel consumption amount calculating unit and a virtual electricity generation amount calculated from the virtual engine rotation speed and the electricity generation drive torque by the electricity generation amount calculating unit, calculates a present electricity generation efficiency from a present fuel consumption amount and a present electricity generation amount, and changes the transmission gear ratio of the continuously variable transmission with the minute amount in a case where the virtual electricity generation efficiency is superior to the present electricity generation efficiency; and an electricity generation drive torque changing unit that, at the time of virtually changing the engine drive torque or the electricity generation drive torque with a minute amount, calculates a virtual electricity generation efficiency from the virtual fuel consumption amount calculated by the fuel consumption amount calculating unit and the virtual electricity generation amount calculated by the electricity generation amount calculating unit, calculates a present electricity generation efficiency from a present fuel consumption amount and a present electricity generation efficiency, and changes the engine drive torque and the electricity generation drive torque with the minute amount, in a case where the virtual electricity generation efficiency is superior to the present electricity generation efficiency. The transmission gear changing unit and the electricity generation drive torque changing unit are alternately operated to perform the electricity generation.

According to a second aspect of the invention, there is provided an electricity generation control device including an engine as a power source of a vehicle; a continuously variable transmission that steplessly changes the power of the engine to transmit it to drive wheels of the vehicle; an electricity generator that rotates following a drive shaft of the engine and can variably controls an electricity generation amount; an electrical storage device that is charged by the electricity generator and supplies the charged power to electrical loads of the vehicle; an engine drive torque control unit that controls a drive torque value of the engine; an electricity generation drive torque control unit that control a drive torque value of the electricity generator; a fuel consumption amount detecting unit that detects a fuel consumption amount of the engine; an electricity generation amount detecting unit that detects an electricity generation amount; a transmission gear ratio changing unit that changes a transmission gear ratio of the continuously variable transmission with a minute amount and at the same time changes an engine drive torque and an electricity generation drive torque to maintain a present speed and a present driving force of the vehicle, calculates an electricity generation efficiency from a fuel consumption amount and an electricity generation amount after changing the transmission gear ratio, and returns the transmission gear ratio of the continuously variable transmission to a state before the change in a case where the calculated electricity generation efficiency is inferior to the electricity generation efficiency calculated before changing the transmission gear ratio; and an electricity generation drive torque changing unit that changes the electricity generation drive torque with a minute amount and at the same time changes an engine drive torque to maintain a present speed and a present driving force of the vehicle, calculates an electricity generation efficiency from a fuel consumption amount and an electricity generation amount after changing the electricity generation drive torque, and returns the electricity generation drive torque to a state before the change in a case where the calculated electricity generation efficiency is inferior to the electricity generation efficiency before changing the electricity generation drive torque. The transmission gear ratio changing unit and the electricity generation drive torque changing unit are alternately operated to perform the electricity generation.

According to the electricity generation control device of the first aspect of the invention, the virtual electricity generation efficiency is calculated at the time of virtually changing at least one of the transmission gear ratio of the continuously variable transmission, the electricity generation drive torque and the engine drive torque with a minute amount from the present state, and the minute amount changing process is repeatedly performed, in a case where the virtual electricity generation efficiency is superior to the present electricity generation efficiency, such that it is possible to gradually approach a control state where the electricity generation efficiency becomes best. In addition, according to the electricity generation device of the first aspect, at least one of the transmission gear ratio of the continuously variable transmission, the electricity generation drive torque and the engine drive torque is gradually changed, such that it is possible to suppress uncomfortable feeling such as a rapid change in the engine rotation speed caused by the rapid change in the control state.

According to an electricity generation control device of the second aspect of the invention, at least one of the transmission gear ratio of the continuously variable transmission, the electricity generation drive torque and the engine drive torque is actually changed with a minute amount, the electricity generation efficiency is calculated from the fuel consumption amount and the electricity generation amount that are detected, and a process of returning at least one of the transmission gear ratio of the continuously variable transmission, the electricity generation drive torque and the engine drive torque to a state before changing with a minute amount is repeatedly performed in a case where the calculated electricity generation efficiency is inferior to the electricity generation efficiency calculated before changing with a minute amount at least one of the transmission gear ratio of the continuously variable transmission, the electricity generation drive torque and the engine drive torque. Therefore, it is possible to gradually reach a control state where the electricity efficiency becomes best. In addition, according to an electricity generation control device of the second aspect of the invention, when it is compared with the electricity generation control device of the first aspect, since a fuel injection amount and the electricity generation amount may be calculated without referring a table, it is not necessary to perform a complicated process. In addition, since the actual fuel injection amount and actual electricity generation amount are detected and then the control is performed, it is not affected by an error effect caused by environmental factor such as a production tolerance, a temporal change or the like.

As shown in an electricity generation map of FIG. 17, in a case where a factor such as a driving load, which is caused by a loaded amount of the vehicle, and a speed of the vehicle becomes different, a map representing the relation between the electricity generation drive torque, the transmission gear ratio and the electricity generation efficiency becomes different. However, according to the electricity generation control device of the aspects, since it gradually approaches a state where the electricity efficiency is best while searching the state, in synchronization with the driving state of each vehicle, it is possible to generate electricity in a state where the electricity efficiency is best.

The foregoing and other object, features, aspects, and advantages of the present invention will become more apparent from the following detailed description of the present invention when taken in conjunction with the accompanying drawings

BRIEF DESCRIPTION OF THE DRAWINGS

FIG. 10 6 is a diagram in which a transition in an electricity generation efficiency according to an operation of an electricity generation control device according to an embodiment 3 of the invention is shown on an electricity generation efficiency map in a normal driving state.

DETAILED DESCRIPTION OF THE INVENTION

Hereinafter, exemplary embodiments of the invention will be described.

Embodiment 1

Figure 1:
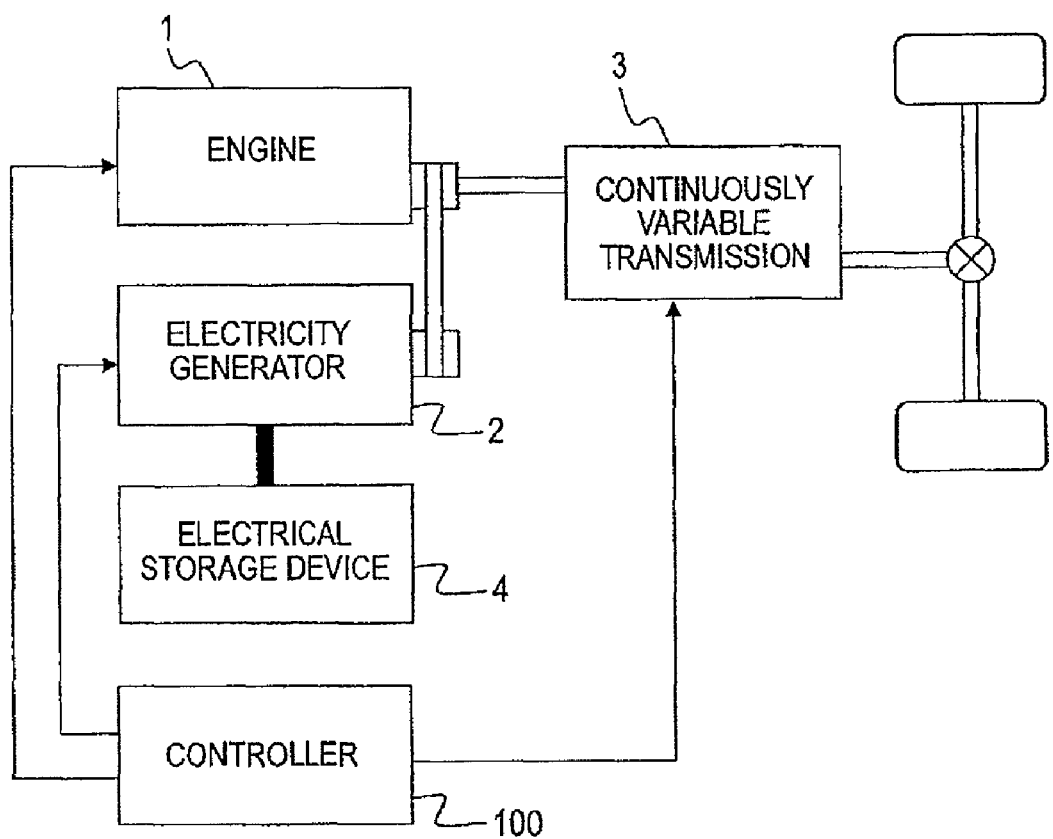
FIG. 1 is a configuration diagram illustrating an electricity generation control device according to an embodiment 1 of the invention.

FIG. 1 shows a configuration diagram illustrating an electricity generation control device according to an embodiment 1 of the invention.

In FIG. 1, a connection is made to transmit the power of an engine 1, which is a power source of a vehicle, to a continuously variable transmission (CVT) 3. The continuously variable transmission 3 changes the speed of the power of an engine 1 to transmit the power to drive wheels of the vehicle. A transmission gear ratio of the continuously variable transmission 3 may varies as a continuous value. An electricity generator 2 connects to the engine 1 to followingly-rotate and generates electricity by the power of the engine 1 to supply the power to an electrical storage device 4 such as a battery. A controller 100 controls an engine drive torque of the engine 1, detects an engine rotation speed thereof, controls an electricity generation drive torque of the electricity generator 2, detects an electricity generator rotation speed, and controls a transmission gear ratio of the continuously variable transmission 3.

Figure 2:
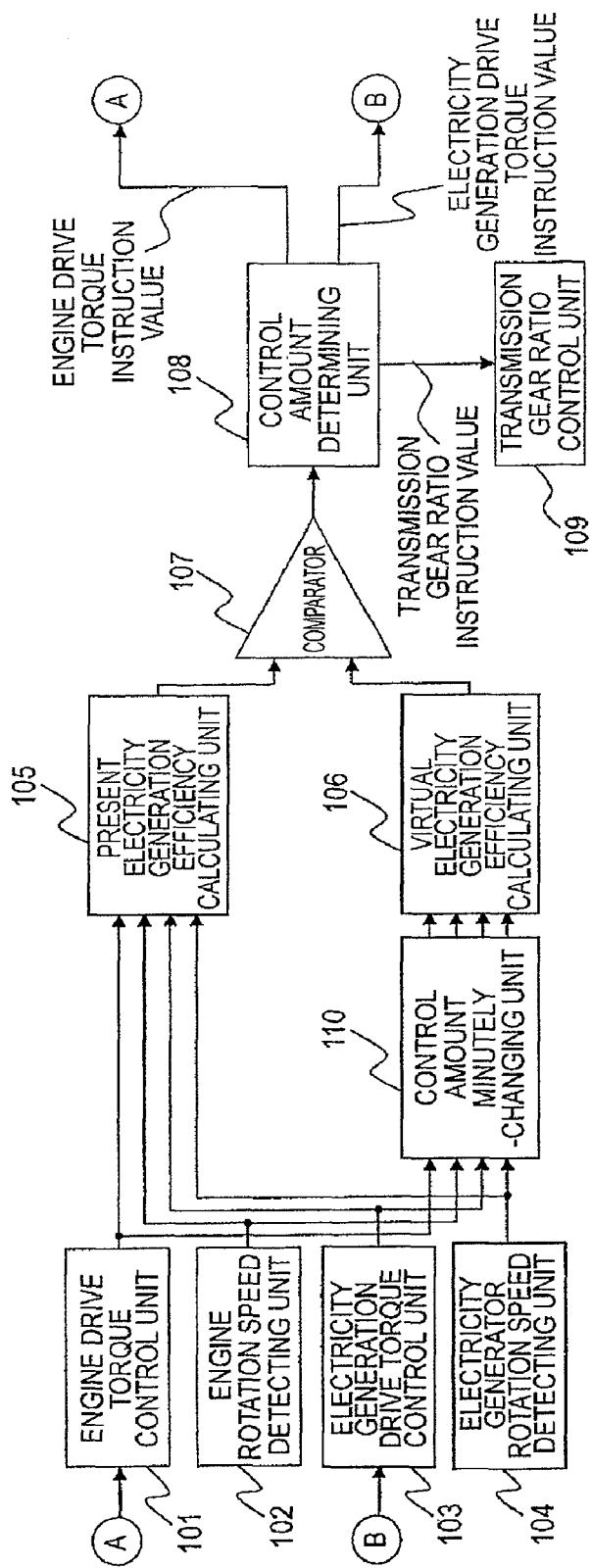
FIG. 2 is a block diagram illustrating a process of electricity generation control device according to the embodiment 1 of the invention.

Next, a configuration of the controller 100 will be described. FIG. 2 shows a block diagram illustrating a process of the controller 100 of FIG. 1. In FIG. 2, the controller 100 includes an engine drive torque control unit 101, an engine rotation speed detecting unit 102, an electricity generation drive torque control unit 103, an electricity generator rotation speed detecting unit 104, a present electricity generation efficiency calculating unit 105, a virtual electricity generation efficiency calculating unit 106, a comparator 107, a control amount determining unit 108, a transmission gear ratio control unit 109 and a control amount minutely-changing unit 110.

The present electricity generation efficiency calculating unit 105 calculates the present electricity generation efficiency based on an engine drive torque instructed to the engine drive torque control unit 101, an engine rotation speed detected by the engine rotation speed detecting unit 102, an electricity generation drive torque instructed to the electricity generation drive torque control unit 103, and an electricity generator rotation speed detected by the electricity generator rotation speed detecting unit 104.

The control amount minutely-changing unit 110 calculates a virtual engine drive torque, a virtual engine rotation speed, a virtual electricity generation drive torque and a virtual electricity generator rotation speed at a time of changing the electricity generation drive torque or the transmission gear ratio while maintaining a driving force and a speed of the vehicle, from the engine drive torque instructed to the engine drive torque control unit 101, the engine rotation speed detected by the engine rotation speed detecting unit 102, the electricity generation drive torque instructed to the electricity generation drive torque control unit 103, and the electricity generator rotation speed detected by the electricity generator rotation speed detecting unit 104. The virtual electricity generation efficiency calculating unit 106 calculates a virtual electricity generation efficiency in a case where the present control amount is virtually change with a minute amount, from the virtual engine drive torque, the virtual engine rotation speed, the virtual electricity generation drive torque and the virtual electricity generator rotation speed calculated by the control amount minutely-changing unit 110. The comparator 107 compares the present electricity generation efficiency calculated by the present electricity generation efficiency calculating unit 105 and the virtual electricity generation efficiency calculated by the virtual electricity generation efficiency calculating unit 106.

Figure 3:
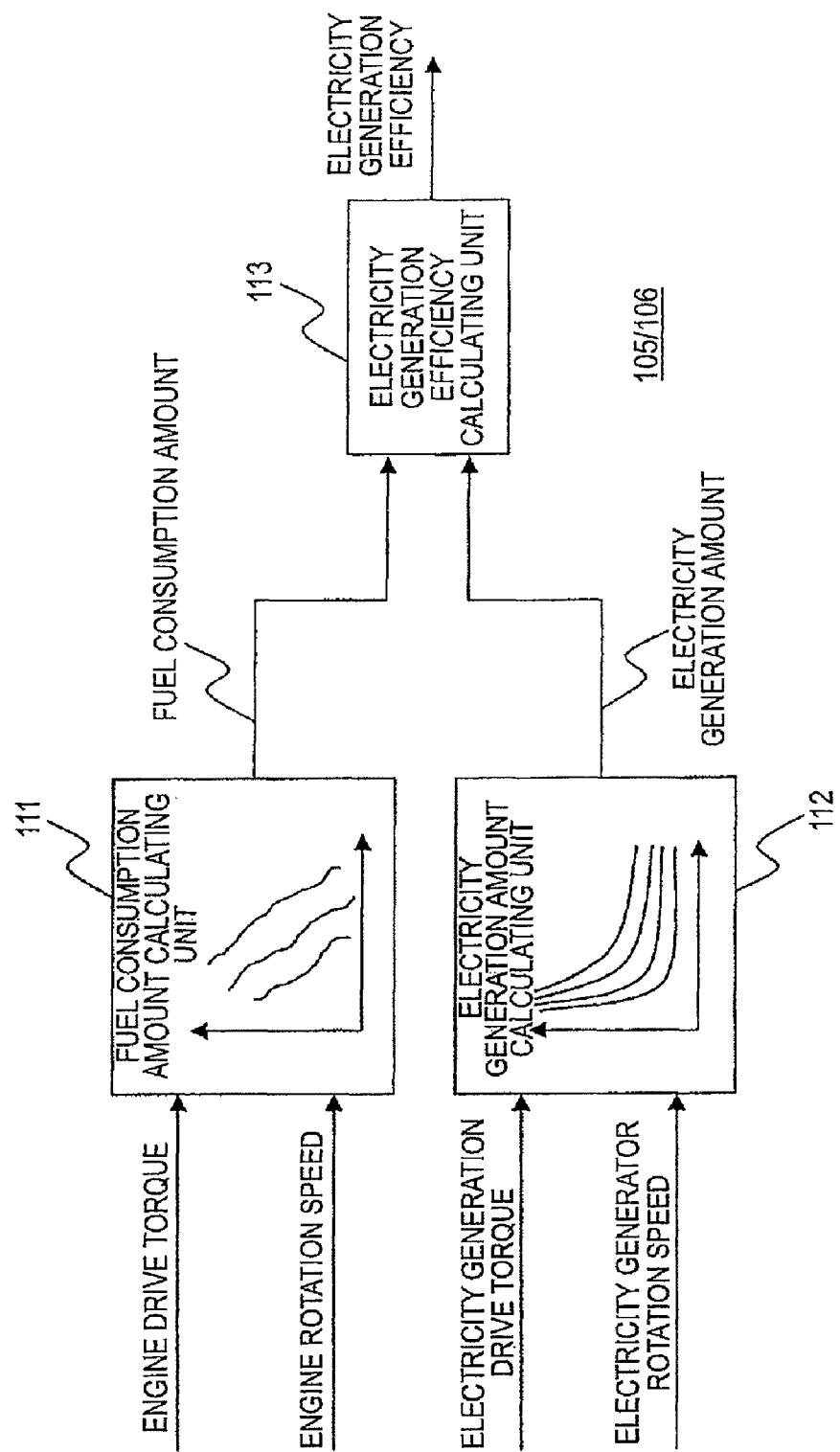
FIG. 3 is a block diagram illustrating processes of a present electricity generation efficiency calculating unit 105 and a virtual electricity generation efficiency calculating unit 106.

The present electricity generation efficiency calculating unit 105 and the virtual electricity generation efficiency calculating unit 106 has the same circuit configuration, and performs a process shown in FIG. 3 to calculate the electricity generation efficiency. A fuel consumption amount calculating unit 111 of FIG. 3 calculates a fuel consumption amount from the engine drive torque and the engine rotation speed by using a table shown in FIG. 4, and an electricity generation amount calculating unit 112 of FIG. 3 calculates an electricity generation amount from the electricity generation drive torque and the electricity generator rotation speed by using a table shown in FIG. 5. An electricity generation efficiency calculating unit 113 of FIG. 3 calculates an electricity generation efficiency from the fuel consumption amount and the electricity generation amount.

Returning to FIG. 2, in a case where the virtual electricity generation efficiency is superior to the present electricity generation efficiency from a comparing result in the comparator 107, the control amount determining unit 108 determines the control amount in a value that is minutely changed, outputs an engine drive torque instruction value to the engine drive torque control unit 101, outputs the electricity generation drive torque instruction value to the electricity generation drive torque control unit 103, and outputs the transmission gear ratio instruction value to the transmission gear ratio control unit 109. In a case where the virtual electricity generation efficiency is inferior to the present electricity generation efficiency from a comparing result in the comparator 107, the control amount is maintained as it is.

Figure 6:
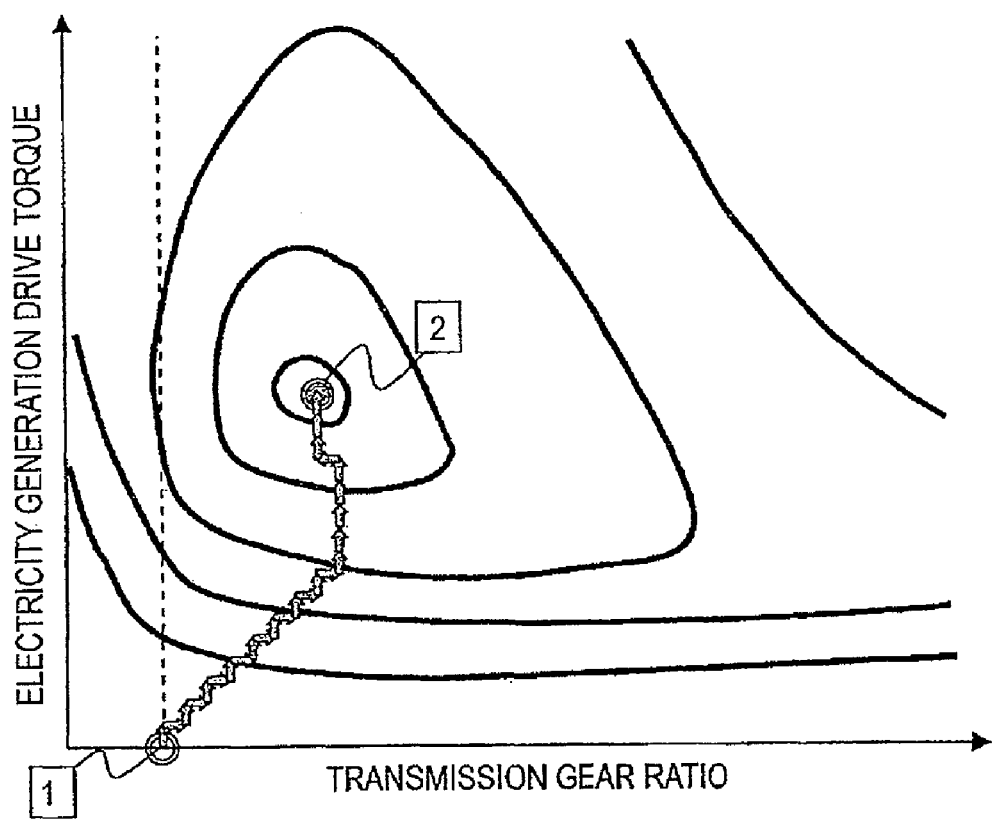
FIG. 6 is a diagram in which a transition in an electricity generation efficiency according to an operation of the electricity generation control device according to the embodiment 1 of the invention is shown on an electricity generation efficiency map in a normal driving state.

Next, the transition of each of the transmission gear ratio, the electricity generation drive torque and the electricity generation efficiency in a case of performing the electricity generation by the electricity generation control device according to the embodiment 1 will be described with reference to FIG. 6. FIG. 6 shows a diagram illustrating an operation in a case of performing the electricity generation by the electricity generation control device according to the embodiment 1, on a map showing the relation of the transmission gear ratio of the continuously variable transmission, the electricity generation drive torque and the electricity generation efficiency in a normal driving state. First, the electricity generation efficiency in a case where the electricity generator does not perform the electricity generation during a normal driving is shown as a state 1 of FIG. 6. And then, in a case where the electricity generation efficiency increases at the time of changing at least one of the electricity generation drive torque and the transmission gear ratio with a minute amount, a process where at least one of the electricity generation drive torque and the transmission ratio is changed with a minute amount is repeatedly performed, and thereby it gradually approaches a state 2 where the electricity generation efficiency becomes best through a path of which the electricity generation efficiency is good and reaches the state 2.

Figure 7:
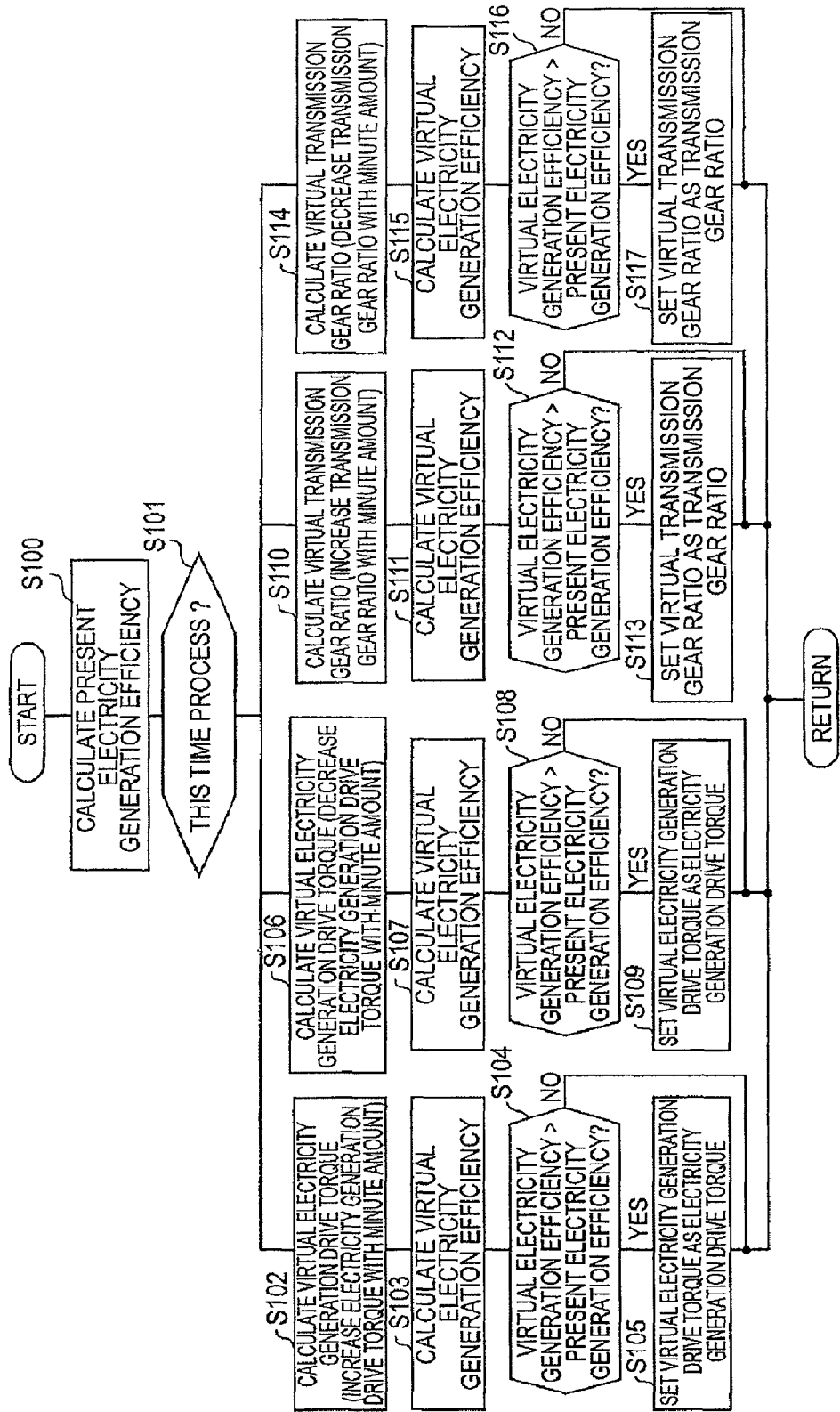
FIG. 7 is a flow chart illustrating an operation of the electricity generation control device according to the embodiment 1 of the invention.

Next, the operation of the controller 100 will be described. FIG. 7 shows a flow chart illustrating the operation of the controller 100 of FIG. 1. The operation shown in FIG. 7 is performed by the controller 100 with a predetermined cycle.

First, in step S100 of FIG. 7, the controller 100 calculates a present electricity generation efficiency. More specifically, a present fuel consumption amount is calculated from present engine rotation speed and engine drive torque by using a table illustrating an engine characteristic of FIG. 4. In addition, a present electricity generation amount is calculated from present electricity generator rotation speed and electricity generation drive torque by using a table illustrating an electricity generator characteristic of FIG. 5. A present electricity generation efficiency is calculated from the fuel consumption amount and the electricity generation amount.

In step S101 of FIG. 7, a process is divided so that steps S102, S106, S110 and S114 are sequentially performed. In this embodiment, the process is divided into four sub-processes to reduce a calculation amount in a single process, but a part of the process or the entire process may be performed in a time.

In step S102 of FIG. 7, a virtual engine drive torque Te' is set in a way that a present engine drive torque Te of the engine 1 increases by a minute amount ΔTe by the control amount minutely-changing unit 110. At the same time, an electricity generation drive torque Tg' is calculated to maintain a torque transmitted to the transmission 3. More specifically, these values are obtained by following equations. Here, a pulley ratio of the engine 1 and the electricity generator 2 is set to 1 for simplicity.

$$Te'=Te+\Delta Te$$

$$Tg'=Tg+\Delta Te$$

wherein, Te: a present engine drive torque, Te': a virtual engine drive torque, Tg: a present electricity generation drive torque, and Tg': a virtual electricity generation drive torque.

Figure 4:
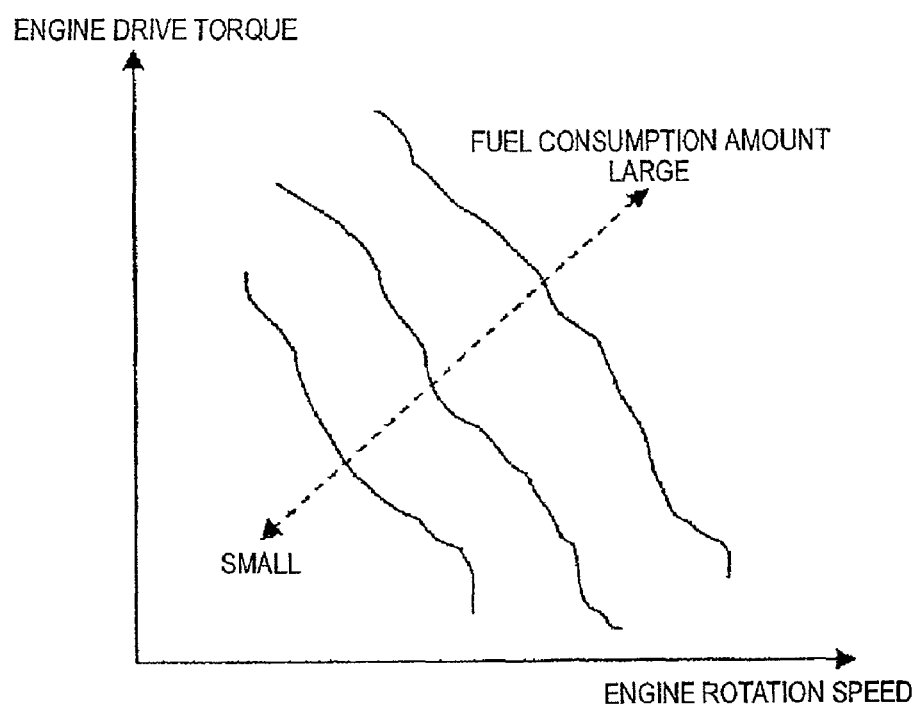
FIG. 4 is a graph illustrating an engine characteristic for calculating a fuel consumption amount from an engine rotation speed and an engine drive torque.
Figure 5:
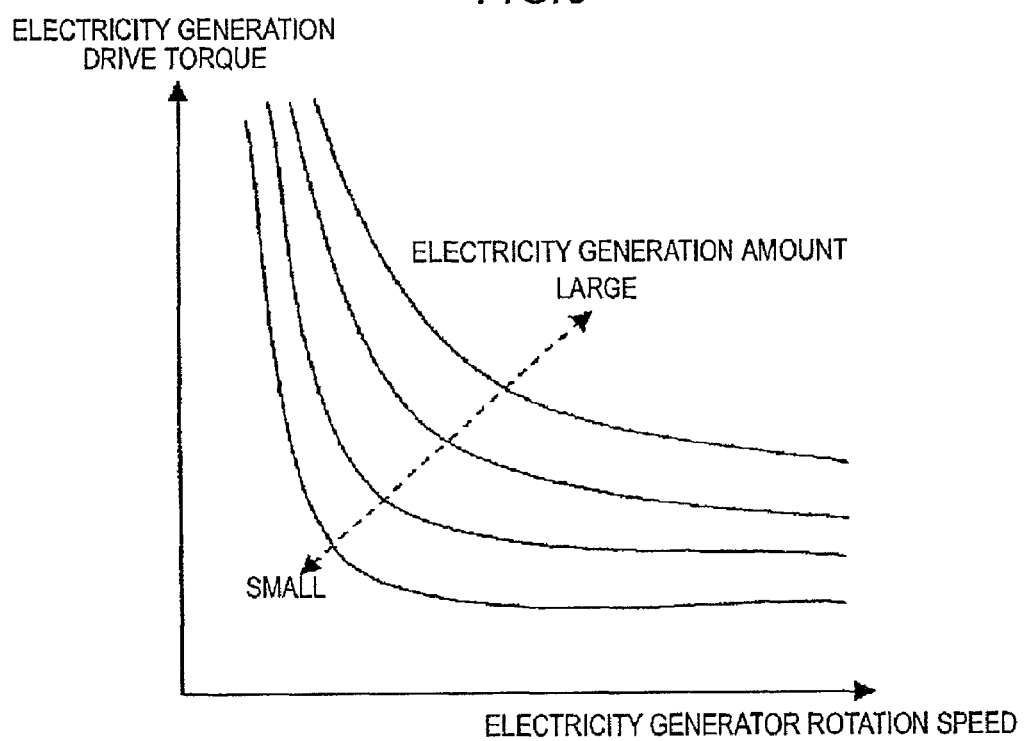
FIG. 5 is a graph illustrating an electricity generator characteristic for calculating an electricity generation amount from electricity generator rotation speed and an electricity generation drive torque.

In step S103 of FIG. 7, a virtual electricity generation efficiency in a case where the virtual engine drive torque Te' is set as the engine drive torque of the engine 1 is calculated. More specifically, the virtual fuel consumption amount is calculated from the engine rotation speed Ne and the virtual engine drive torque Te' by using a table illustrating an engine characteristic as shown in FIG. 4. In addition, the virtual electricity generation amount is calculated from the electricity generator rotation speed Ng and the virtual electricity generation drive torque Tg' by using a table illustrating an electricity generator characteristic as shown in FIG. 5. The virtual electricity generation efficiency is calculated by dividing the virtual electricity generation amount by the virtual fuel consumption amount.

In step S104 of FIG. 7, the present electricity generation efficiency obtained in step S100 and the virtual electricity generation efficiency obtained in step S103 are compared with each other. The process proceeds to step S105, in a case where the virtual electricity generation efficiency is superior to the present electricity generation efficiency, and the process at this time is terminated in other cases. In step S105, the virtual engine drive torque Te' is output to the engine drive torque control unit 101 of FIG. 2 as an engine drive torque instruction value, and the virtual electricity generation drive torque Tg' is output to the electricity generation drive torque control unit 103 of FIG. 2 as an electricity generation drive torque instruction value. And then, the process at this time is terminated.

In step S106 of FIG. 7, the virtual engine drive torque Te' is set in a way that the present engine drive torque Te of the engine 1 decreases by a minute amount ΔTe by the control amount minutely-changing unit 110 of FIG. 2. At the same time, the virtual electricity generation drive torque Tg' is calculated to maintain a torque transmitted to the transmission 3. More specifically, these values are obtained by following equations. Here, a pulley ratio of the engine 1 and the electricity generator 2 is set to 1 for simplicity.

$$Te'=Te-\Delta Te$$

$$Tg'=Tg-\Delta Te$$

wherein, Te: a present engine drive torque, Te': a virtual engine drive torque, Tg: a present electricity generation drive torque, and Tg': a virtual electricity generation drive torque.

In step S107 of FIG. 7, a virtual electricity generation efficiency in a case where the virtual engine drive torque Te' is set as the engine drive torque of the engine 1 is calculated. More specifically, the virtual fuel consumption amount is calculated from the engine rotation speed Ne and the virtual engine drive torque Te' by using a table illustrating an engine characteristic as shown in FIG. 4. In addition, the virtual electricity generation amount is calculated from the electricity generator rotation speed Ng and the virtual electricity generation drive torque Tg' by using a table illustrating an electricity generator characteristic as shown in FIG. 5. The virtual electricity generation efficiency is calculated by dividing the virtual electricity generation amount by the virtual fuel consumption amount.

In step S108 of FIG. 7, the present electricity generation efficiency obtained in step S100 and the virtual electricity generation efficiency obtained in step S107 are compared with each other. The process proceeds to step S109, in a case where the virtual electricity generation efficiency is superior to the present electricity generation efficiency, and the process at this time is terminated in other cases. In step S109, the virtual engine drive torque Te' is output to the engine drive torque control unit 101 of FIG. 2, as an engine drive torque instruction value, and the virtual electricity generation drive torque Tg' is output to the electricity generation drive torque control unit 103 of FIG. 2, as an electricity generation drive torque instruction value. And then, the process at this time is terminated.

In step S110 of FIG. 7, a virtual transmission gear ratio G' is calculated in a way that the present transmission gear ratio G of the continuously variable transmission 3 increases by $\Delta G$ by the control amount minutely-changing unit 110 of FIG. 2.

$$G'=G+\Delta G$$

At the same time, even when the transmission gear ratio is changed from a present transmission gear ratio G to a virtual transmission gear ratio G', the control amount minutely-changing unit 110 of FIG. 2 calculates a virtual engine drive torque Te' and a virtual engine rotation speed Ne' to maintain a present driving force F and a speed Vs of a vehicle, based on the present engine drive torque Te and the present engine rotation speed Ne, and calculates a virtual electricity generation drive torque Tg' and a virtual electricity generator rotation speed Ng' based on the present electricity generation drive torque Tg and the present electricity generator rotation speed Ng.

More specifically, these values are obtained by following equations.

since $Vs \propto Ne/G$, $$Ne'=Ne\{(G+\Delta G)/G\}, Ng'=Ng\{G+\Delta G)/G\}$$

since $F \propto TG$, $$T'=T\{G/\{G+\Delta G\} \text{ (wherein, } T=Te-Tg)$$

therefore, $Te'=Te\{G/(G+\Delta G)\}, Tg'=Tg\{G/(G+\Delta G)\}$ wherein, Vs: a speed of a vehicle, F: a driving force of a vehicle, G: a transmission gear ratio, Te: a present engine drive torque, Te': a virtual engine drive torque, Tg: a present electricity generation drive torque, Tg': a virtual electricity generation drive torque, Ne: a present engine rotation speed, Ne': a virtual engine rotation speed, Ng: a present electricity generator rotation speed, and Ng': a virtual electricity generator rotation speed.

In step S111 of FIG. 7, the electricity generation efficiency in a case where a virtual transmission gear ratio G' is set as the transmission gear ratio of the continuously variable transmission 3 is calculated. More specifically, the virtual fuel consumption amount is calculated from the virtual engine rotation speed Ne' and the virtual engine drive torque Te' by using a table illustrating an engine characteristic as shown in FIG. 4. In addition, the virtual electricity generation amount is calculated from the virtual electricity generator rotation speed Ng' and the virtual electricity generation drive torque Tg' by using a table illustrating an electricity generator characteristic as shown in FIG. 5. The virtual electricity generation efficiency is calculated by dividing the virtual electricity generation amount by the virtual fuel consumption amount.

In step S112 of FIG. 7, the present electricity generation efficiency obtained in step S100 and the virtual electricity generation efficiency obtained in step S111 are compared with each other. The process proceeds to step S113, in a case where the virtual electricity generation efficiency is superior to the present electricity generation efficiency, and the process at this time is terminated in other cases. In step S113, the virtual transmission gear ratio G' is output to the transmission gear ratio control unit 109 of FIG. 2 as a transmission gear ratio instruction value, the virtual engine drive torque Te' calculated in step S110 is output to the engine drive torque control unit 101 of FIG. 2 as an engine drive torque instruction value, the virtual electricity generation drive torque Tg' is output to the electricity generation drive torque control unit 103 of FIG. 2 as an electricity generation drive torque instruction value. And then, the process at this time is terminated.

In step S114 of FIG. 7, a virtual transmission gear ratio G' is calculated in a way that the present transmission gear ratio G of the continuously variable transmission 3 decreases by $\Delta G$ by the control amount minutely-changing unit 110 of FIG. 2.

$$G'=G-\Delta G$$

At the same time, even when the transmission gear ratio is changed from a present transmission gear ratio G to a virtual transmission gear ratio G', the control amount minutely-changing unit 110 of FIG. 2 calculates a virtual engine drive torque Te' and a virtual engine rotation speed Ne' to maintain the present driving force F and the speed Vs of a vehicle, based on the present engine drive torque Te and the present engine rotation speed Ne, and calculates a virtual electricity generation drive torque Tg' and a virtual electricity generator rotation speed Ng' based on the present electricity generation drive torque Tg and the present electricity generator rotation speed Ng.

More specifically, these values are obtained by following equations.

since $Vs \propto Ne/G$, $$Ne'=Ne\{(G-\Delta G)/G\}, Ng'=Ng\{G-\Delta G)/G\}$$

since $F \propto TG$, $$T'=T\{G/(G-\Delta G) \text{ (wherein, } T=Te-Tg)$$

therefore, $Te'=Te\{G/(G-\Delta G)\}, Tg'=Tg\{G/(G-\Delta G)\}$ wherein, Vs: a speed of a vehicle, F: a driving force of a vehicle, G: a transmission gear ratio, Te: a present engine drive torque, Te': a virtual engine drive torque, Tg: a present electricity generation drive torque, Tg': a virtual electricity generation drive torque, Ne: a present engine rotation speed, Ne': a virtual engine rotation speed, Ng: a present electricity generator rotation speed, and Ng': a virtual electricity generator rotation speed.

In step S115 of FIG. 7, the electricity generation efficiency in a case where a virtual transmission gear ratio G' is set as the transmission gear ratio of the continuously variable transmission 3 is calculated. More specifically, the virtual fuel consumption amount is calculated from the virtual engine rotation speed Ne' and the virtual engine drive torque Te' by using a table illustrating an engine characteristic as shown in FIG. 4. In addition, the virtual electricity generation amount is calculated from the virtual electricity generator rotation speed Ng' and the virtual electricity generation drive torque Tg' by using a table illustrating an electricity generator characteristic as shown in FIG. 5. The virtual electricity generation efficiency is calculated by dividing the virtual electricity generation amount by the virtual fuel consumption amount.

In step S116 of FIG. 7, the present electricity generation efficiency obtained in step S100 and the virtual electricity generation efficiency obtained in step S115 are compared with each other. The process proceeds to step S117, in a case where the virtual electricity generation efficiency is superior to the present electricity generation efficiency, and the process at this time is terminated in other cases. In step S117, the virtual transmission gear ratio G' is output to the transmission gear ratio control unit 109 of FIG. 2 as a transmission gear ratio instruction value, the virtual engine drive torque Te' obtained in step 114 is output to the engine drive torque control unit 101 of FIG. 2 as an engine drive torque instruction value, the virtual electricity generation drive torque Tg' is output to the electricity generation drive torque control unit 103 of FIG. 2 as an electricity generation drive torque instruction value. And then, the process at this time is terminated.

According to the electricity generation control device of the embodiment 1, the electricity generation can be performed in a state a where the electricity generation efficiency becomes best. In addition, since the electricity generation drive torque, the engine drive torque and the transmission gear ratio are not rapidly changed, shock does not occur in a vehicle and thereby uncomfortable feeling does not occur.

Embodiment 2

In the embodiment 1, the electricity generation efficiency in a case where the engine drive torque or the transmission gear ratio is virtually changed is calculated, and an operation for actually changing the engine drive torque or the transmission gear ratio is repeatedly performed in a case where the calculated virtual electricity generation efficiency is superior to the present electricity generation efficiency. Contrary to this, in the embodiment 2, the engine drive torque or the transmission gear ratio is actually changed, the electricity generation efficiencies before and after the change are compared with each other, and then an operation for returning into the engine drive torque or the transmission gear ratio before the change is repeatedly performed in a case where the electricity generation efficiency before the change is superior to that after the change.

Figure 8:
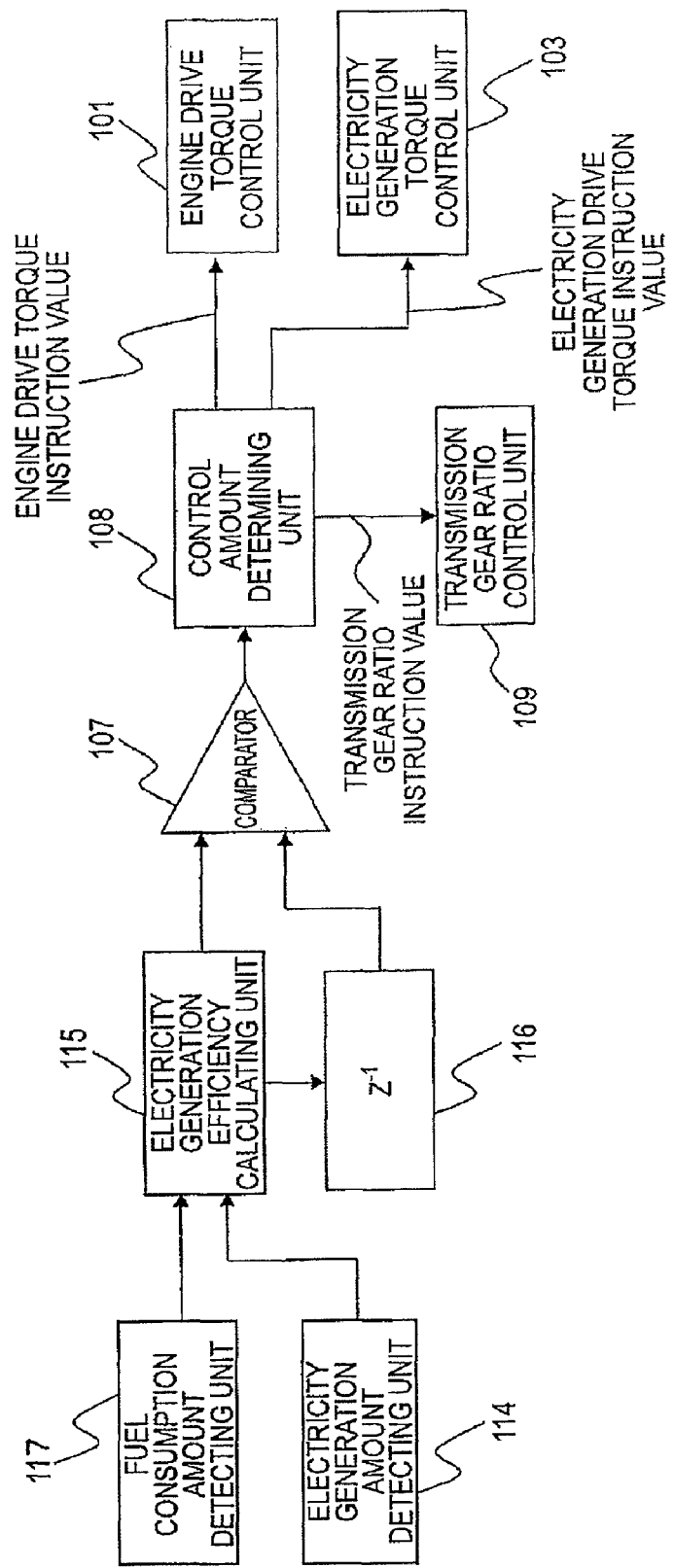
FIG. 8 is a block diagram illustrating a process of an electricity generation control device according to an embodiment 2 of the invention.

FIG. 8 shows a configuration diagram of an electricity generation control device according to the embodiment 2 of the invention. In FIG. 8, the configuration in which a control amount determining unit 108 moves control point with a minute amount so as not to cause an adverse effect on the driving of the vehicle and gives an instruction to each of an engine drive torque control unit 101, an electricity generation drive torque control unit 103 and a transmission gear ratio control unit 109 is substantially the same as that of the embodiment 1.

In the embodiment 2, a fuel consumption amount detecting unit 117 and an electricity generation amount detecting unit 114 that actually measure or detect a fuel consumption amount and an electricity generation amount, respectively, are provided. The electricity generation efficiency calculating unit 115 calculates a present electricity generation efficiency from the fuel consumption amount detected by the fuel consumption amount detecting unit 117 and the electricity generation amount detected by the electricity generation amount detecting unit 114. The control amount determining unit 108 stores an electricity generation efficiency calculated before changing the control point in a storage unit 116, and a comparator 107 compares the electricity generation efficiencies before and after the change with each other. In a case where the electricity generation efficiency before changing the control point is superior to that after changing the control point, the control amount determining unit 108 returns the control amount instructed to each of the engine drive torque control unit 101, the electricity generation drive torque control unit 103 and the transmission gear ratio control unit 109 to a state before the change. By performing this process repeatedly, it approaches to a control point where the electricity generation efficiency is excellent.

Figure 9:
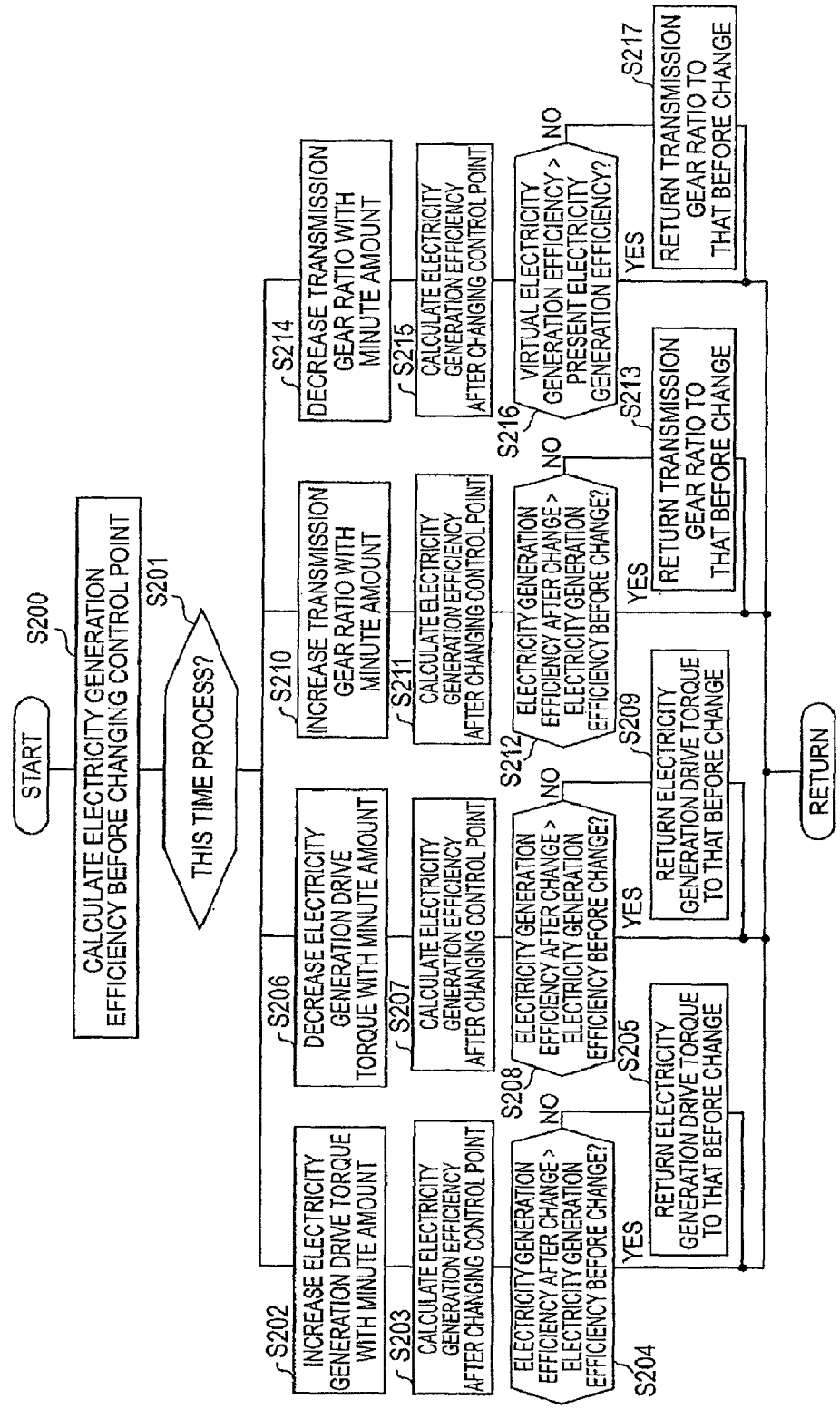
FIG. 9 is a flow chart illustrating an operation of the electricity generation control device according to the embodiment 2 of the invention.

Next, the operation of the controller 100 of the embodiment 2 will be described. FIG. 9 shows a flow chart illustrating the operation of the controller 100. The operation shown in FIG. 9 is performed by the controller 100 in a predetermined cycle.

First, in step S200 of FIG. 9, the controller 100 calculates the electricity generation efficiency before changing the control point from the electricity generation amount and the fuel consumption amount detected by an actual measurement. In step S201, a process is divided so that steps S202, S206, S210 and S214 are sequentially performed.

In step S202, the electricity generation drive torque Tg output to the electricity generation drive torque control unit 103 increases by a minute amount $\Delta T$ and the engine drive torque Te output to the engine drive torque control unit 101 increases by a minute amount $\Delta T$ to maintain the magnitude of torque transmitted to the transmission. In step S203, the electricity generation efficiency after changing the control point is calculated from the electricity generation amount and the fuel consumption amount that are detected.

In step S204, the electricity generation efficiency before changing the control point, which is calculated in step S200, and the electricity generation efficiency after changing the control point, which is detected in step S203 are compared with each other. In a case where the electricity generation efficiency after the change is superior to that before the change, the process at this time is terminated. In other cases, the process proceeds to step S205. In step s205, the engine drive torque and the electricity generation drive torque changed in step S202 are returned to that before the change, and the returned engine drive torque and the electricity generation drive torque are output to the engine drive torque control unit 101 and the electricity generation drive torque control unit 103, respectively. And then, this process is terminated.

In step S206, the engine drive torque Te output to the engine drive torque control unit 101 decreases by a minute amount $\Delta T$ and the electricity generation drive torque Tg output to the electricity generation drive torque control unit 103 decreases by a minute amount ΔT to maintain the magnitude of torque transmitted to the transmission 3. In step s203, the electricity generation efficiency after changing the control point is calculated from the electricity generation amount and the fuel consumption amount that are detected.

In step S207, the electricity generation efficiency before changing the control point, which is calculated in step S200, and the electricity generation efficiency after changing the control point, which is calculated in step S207 are compared with each other. In a case where the electricity generation efficiency after the change is superior to that before the change, the process at this time is terminated. In other cases, the process proceeds to step S209. In step s209, the engine drive torque and the electricity generation drive torque changed in step S206 are returned to that before the change, and the returned engine drive torque and the electricity generation drive torque are output to the engine drive torque control unit 101 and the electricity generation drive torque control unit 103, respectively. And then, this process is terminated.

In step S210, the transmission gear ratio G output to the transmission gear ratio control unit 109 increases by a minute amount ΔG, the engine drive torque Te' and the electricity generation drive torque Tg' are calculated to maintain the speed Vs and the driving force F of a vehicle, and the calculated Te' and Tg' are output to the engine drive torque control unit 101 and the electricity generation drive torque control unit 103, respectively. More specifically, the engine drive torque Te' and the electricity generation drive torque Tg' are calculated by following equations.

since $F \propto TG$, $T' = T\{G/(G+\Delta G)\}$ (wherein, $T = Te - Tg$)

therefore, $Te' = Te\{G/(G+\Delta G)\}$, $Tg' = Tg\{G/(G+\Delta G)\}$ wherein, F: a driving force of a vehicle, G: a transmission gear ratio, Te: a present engine drive torque, Te': an engine drive torque after the change, Tg: a present electricity generation drive torque, Tg': an electricity generation drive torque after the change.

In step S211, the electricity generation efficiency after changing the control point is calculated from the electricity generation amount and the fuel consumption amount that are detected. In step S212, the electricity generation efficiency before changing the control point, which is calculated in step S200, and the electricity generation efficiency after changing the control point, which is calculated in step S211 are compared with each other. In a case where the electricity generation efficiency after the change is superior to that before the change, the process at this time is terminated. In other cases, the process proceeds to step S213. In step s213, the engine drive torque and the electricity generation drive torque changed in step S210 are returned to that before the change, and the returned engine drive torque and the electricity generation drive torque are output to the engine drive torque control unit 101 and the electricity generation drive torque control unit 103, respectively. And then, this process is terminated.

In step S214, the transmission gear ratio G output to the transmission gear ratio control unit 109 decreases by a minute amount ΔG, the engine drive torque Te' and the electricity generation drive torque Tg' are calculated to maintain the speed Vs and the driving force F of a vehicle, and the calculated Te' and Tg' are output to the engine drive torque control unit 101 and the electricity generation drive torque control unit 103, respectively. More specifically, the engine drive torque Te' and the electricity generation drive torque Tg' are calculated by following equations.

since $F \propto TG$, $T' = T\{G/(G-\Delta G)\}$ (wherein, $T = Te - Tg$)

therefore, $Te' = Te\{G/(G-\Delta G)\}$, $Tg' = Tg\{G/(G-\Delta G)\}$ wherein, F: a driving force of a vehicle, G: a transmission gear ratio, Te: a present engine drive torque, Te': an engine drive torque after the change, Tg: a present electricity generation drive torque, Tg': an electricity generation drive torque after the change.

In step S215, the electricity generation efficiency after changing the control point is calculated from the electricity generation amount and the fuel consumption amount that are detected. In step S216, the electricity generation efficiency before changing the control point, which is calculated in step S200, and the electricity generation efficiency after changing the control point, which is calculated in step S215 are compared with each other. In a case where the electricity generation efficiency after the change is superior to that before the change, the process at this time is terminated. In other cases, the process proceeds to step S217. In step S217, the engine drive torque and the electricity generation drive torque changed in step S214 are returned to that before the change, and the returned engine drive torque and the electricity generation drive torque are output to the engine drive torque control unit 101 and the electricity generation drive torque control unit 103, respectively. And then, this process is terminated.

According to the electricity generation control device of the embodiment 2, when it is compared with that of the embodiment 1, since the fuel consumption amount and the electricity generation amount are calculated with reference to the map, a computer does not need to perform a complicated process. In addition, even when the fuel consumption amount characteristic of the engine and the electricity generation amount characteristic of the electricity generator, which are referred in the embodiment 1, are mismatched between an actual operation and a map stored in the computer (for example, the occurrence of individual variance or temporal change), it is possible to reach a control state where the electricity generation efficiency becomes best.

Embodiment 3

In the embodiment 2, the electricity generation efficiency in a case where the control point is changed with a minute amount from a point of time when the electricity generation is needed is compared with that before changing the control point, and the process for changing the control point is performed in a case where the electricity generation efficiency after the change is superior to that before the change. In the embodiment 3, at a point of time when the electricity generation is needed, an electricity generation drive torque increases to secure a minimum electricity generation amount, and then a process for changing the control point is performed. For example, the minimum value is set to an amount of power that is being discharged by an electrical storage device in no electricity generation state or the like.

Next, the transition of each of the transmission gear ratio, the electricity generation drive torque and the electricity generation efficiency in a case of performing the electricity generation by the electricity generation control device according to the embodiment 3 will be described with reference to FIG.

Figure 10:
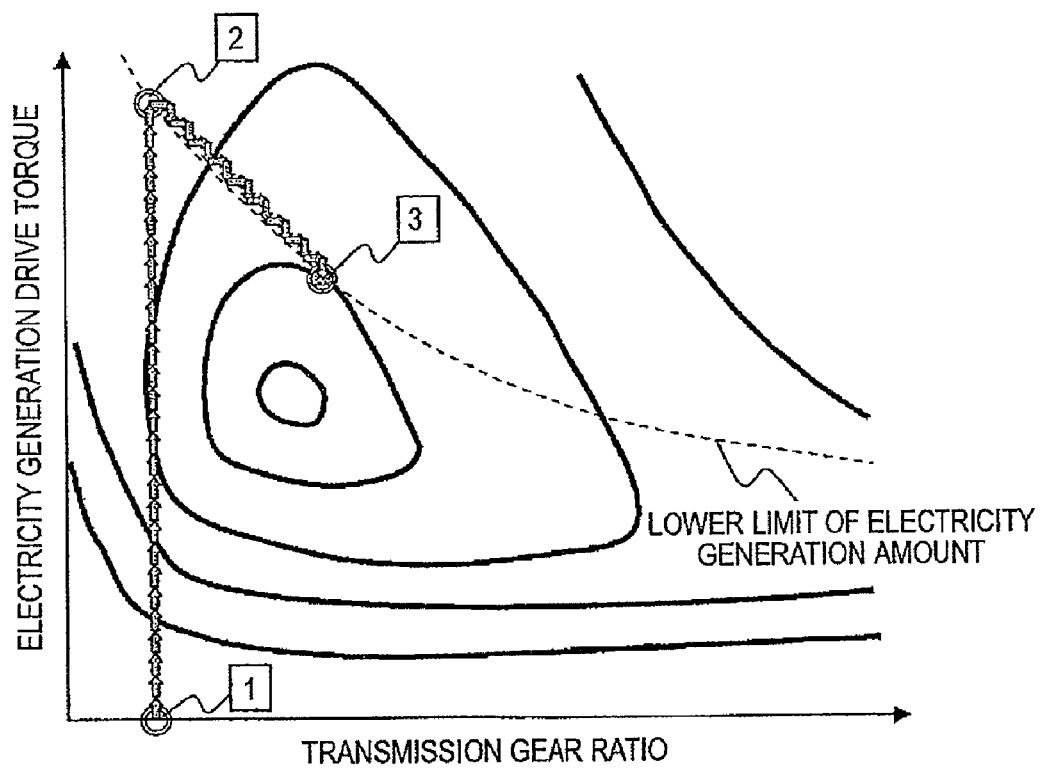

10. FIG. 10 shows a diagram illustrating an operation in a case of performing the electricity generation by the electricity generation control device according to the embodiment 3, on a map showing the relation of the transmission gear ratio of the continuously variable transmission, the electricity generation drive torque and the electricity generation efficiency in a normal driving state. First, the electricity generation efficiency in a case where the electricity generator does not perform the electricity generation during a normal driving is shown as a state 1 of FIG. 10. And then, until the electricity generation amount reaches the lower limit of the electricity generation amount, the electricity generation drive torque increases and reaches a state 2. In a case where the electricity generation efficiency increases at the time of changing at least one of the electricity generation drive torque and the transmission gear ratio with a minute amount, a process where at least one of the electricity generation drive torque and the transmission gear ratio is changed with a minute amount is repeatedly performed, and thereby it gradually approaches a state 3 where the electricity generation efficiency becomes best while the minimum value of the electricity generation amount being secured. Thereby, the electricity generation is may be performed in the state 3.

As an example, the lower limit of the electricity generation amount is set to a supplied amount of power to electrical loads of a vehicle such as a head lamp. The supplied amount of power to the electrical loads of a vehicle is detected by a unit (not shown) that detects the supplied amount of power to the electrical loads of a vehicle. Due to this, it is possible to supply a consumed amount of power needed by a vehicle, thereby preventing the electrical storage device from being discharged totally.

Figure 11:
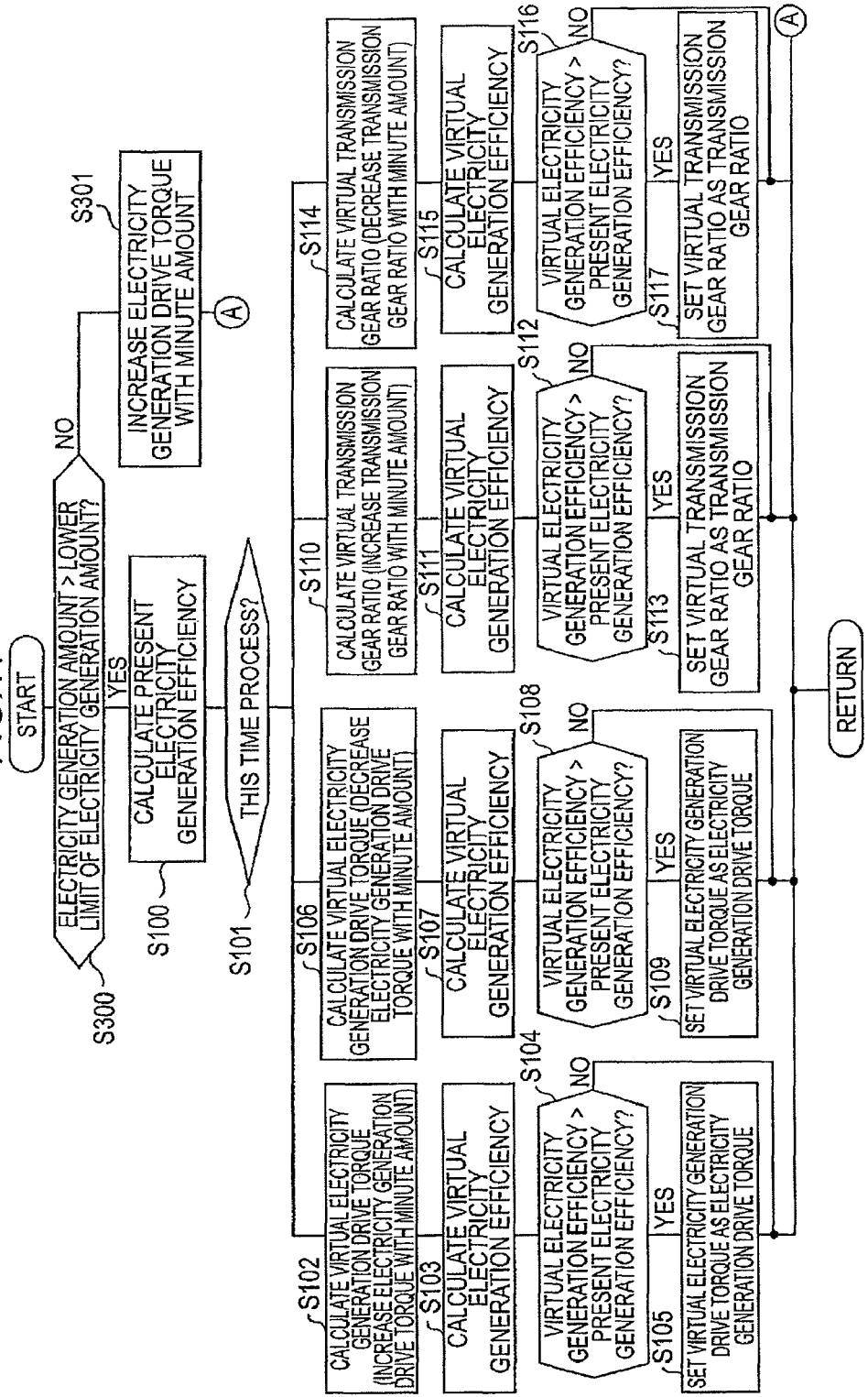
FIG. 11 is a flow chart illustrating an operation of the electricity generation control device according to the embodiment 3 of the invention.

Next, the operation of a controller 100 of the embodiment 3 will be described. FIG. 11 shows a flow chart illustrating the operation of the controller 100 of the embodiment 3. "A" parts of FIG. 11 connects to each other. The outline of the controller 100 of the embodiment 3 is substantially the same as that of the embodiment 1, such that the difference therebetween will be described. Mainly, it is different from the embodiment 1 in that an operation for increasing the electricity generation drive torque is performed in a case where the electricity generation amount does not satisfy the minimum value of the electricity generation amount.

First, in step S300 of FIG. 11, the controller 100 compares a present electricity generation amount and the lower limit of an electricity generation amount with each other. In a case where the present electricity generation amount is larger than the lower limit, the process proceeds to step S100. In other cases, the process proceeds to step S301. In step S301, an electricity generation drive torque Tg output to the electricity generation drive torque control unit 103 increases by a minute amount ΔT, and an engine drive torque Te output to the engine drive torque control unit 101 also increases by a minute amount ΔT to maintain the magnitude of a torque T transmitted to the transmission 3. And then, the process at this time is terminated. Other operations are substantially the same as that of the embodiment 1.

According to the electricity generation control device of the embodiment 3, when it is compared to that of the embodiment 1, it is possible to perform the electricity generation in a control state where the electricity generation efficiency become best while securing a minimum of electricity generation amount needed for a vehicle.

Embodiment 4

In the embodiment 2, the electricity generation efficiency in a case where the control state is changed with a minute amount from a point of time when the electricity generation is needed is compared with that before changing the control state, and the process for returning the control state to that before the change is performed in a case where the electricity generation efficiency before the change is superior to that after the change. As is the case with the embodiment 3, in the embodiment 4, at a point of time when the electricity generation is needed, the electricity generation drive torque increases to first secure a minimum of electricity generation amount, and then a process for changing the control state with a minimum amount is performed.

The transition of each of the transmission gear ratio, the electricity generation drive torque and the electricity generation efficiency in a case of performing the electricity generation by the electricity generation control device according to the embodiment 4 is substantially the same as that of the embodiment 3 as shown in FIG. 10.

Figure 12:
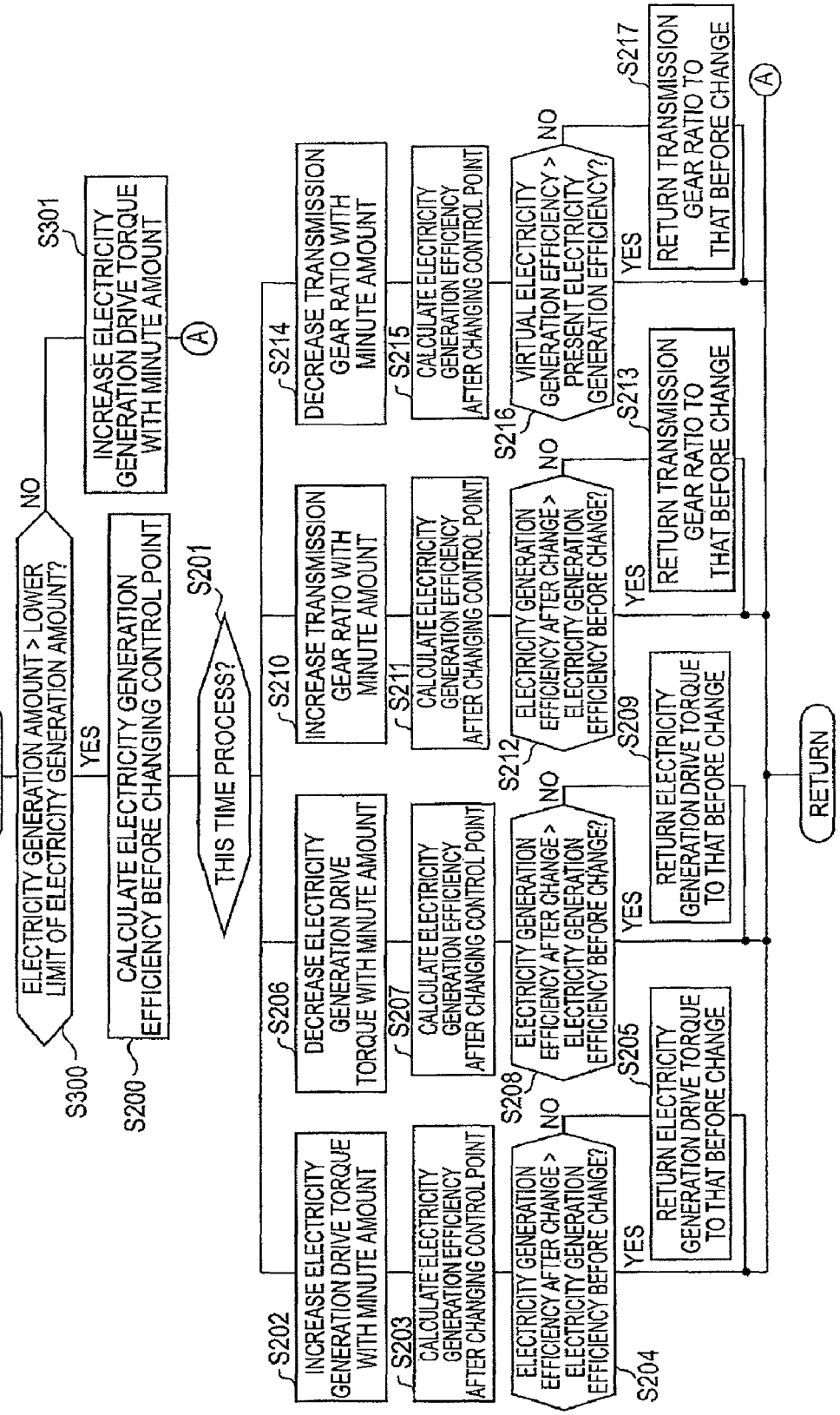
FIG. 12 is a flow chart illustrating an operation of an electricity generation control device according to an embodiment 4 of the invention.

Next, the operation of a controller 100 of the embodiment 4 will be described. FIG. 12 shows a flow chart illustrating the operation of the controller 100 of the embodiment 4. "A" parts of FIG. 12 connects to each other. The outline of the controller 100 of the embodiment 4 is substantially the same as that of the embodiment 2, such that the difference therebetween will be described. Mainly, it is different from the embodiment 2 in that an operation for increasing the electricity generation drive torque is performed in a case where the electricity generation amount satisfies the minimum value of the electricity generation amount.

First, in step S300 of FIG. 12, the controller 100 compares a present electricity generation amount and the lower limit of an electricity generation amount with each other. In a case where the present electricity generation amount is larger than the lower limit, the process proceeds to step S200. In other cases, the process proceeds to step S301. In step S301, an electricity generation drive torque Tg output to the electricity generation drive torque control unit 103 increases by a minute amount ΔT, and an engine drive torque Te output to the engine drive torque control unit 101 also increases by a minute amount ΔT to maintain the magnitude of a torque T transmitted to the transmission 3. And then, the process at this time is terminated. Other operations are substantially the same as that of the embodiment 2.

According to the electricity generation control device of the embodiment 4, when it is compared to that of the embodiment 2, it is possible to perform the electricity generation in a control state where the electricity generation efficiency become best while securing a minimum of electricity generation amount needed for a vehicle.

Embodiment 5

In the embodiment 3, the lower limit is set, and at a point of time when an electricity generation becomes necessary, a control is performed to secure first a necessary electricity generation amount. In the embodiment 5, the upper limit of the electricity generation amount is further set, the control is performed to search a state where the electricity generation amount becomes highest, while transitioning between the lower limit and the upper limit of the electricity generation amount.

Figure 13:
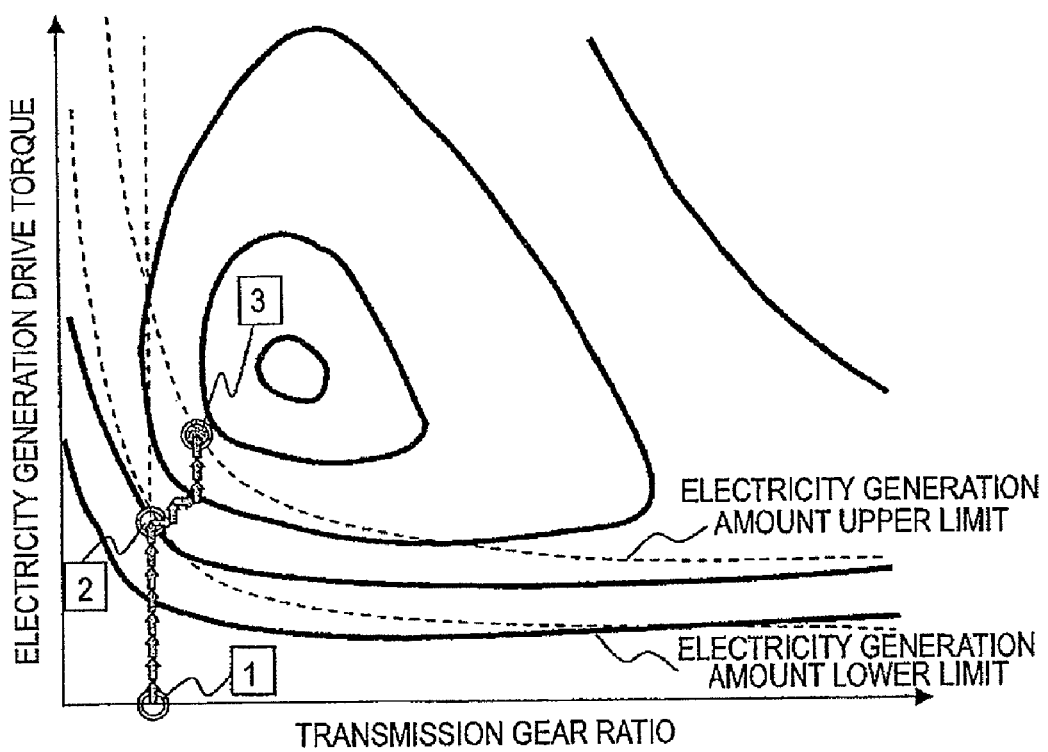
FIG. 13 is a diagram in which a transition in an electricity generation efficiency according to an operation of an electricity generation control device according to an embodiment 5 of the invention is shown on an electricity generation efficiency map in a normal driving state.

Next, the transition of each of the transmission gear ratio, the electricity generation drive torque and the electricity generation efficiency in a case of performing the electricity generation by the electricity generation control device according to the embodiment 5 will be described with reference to FIG. 13. FIG. 13 shows a diagram illustrating an operation in a case of performing the electricity generation by the electricity generation control device according to the embodiment 5, on a map showing the relation of the transmission gear ratio of the continuously variable transmission, the electricity generation drive torque and the electricity generation efficiency in a normal driving state.

First, the electricity generation efficiency in a case where the electricity generator does not perform the electricity generation during a normal driving is shown as a state 1 of FIG. 13. And then, until the electricity generation amount reaches the lower limit (lower-side dotted line) of the electricity generation amount, the electricity generation drive torque increases and reaches a state 2. In a case where the electricity generation efficiency increases at the time of changing at least one of the electricity generation drive torque and the transmission gear ratio with a minute amount, a process where at least one of the electricity generation drive torque and the transmission gear ratio is changed with a minute amount is repeatedly performed, and thereby it gradually reaches a state 3 where the electricity generation amount reaches the upper limit (upper-side dotted line) thereof through a path where the electricity generation efficiency becomes best. Thereby, the electricity generation may be performed in a state where the electricity generation efficiency becomes best, while the electricity generation amount being present within the upper and lower limit thereof.

Figure 14:
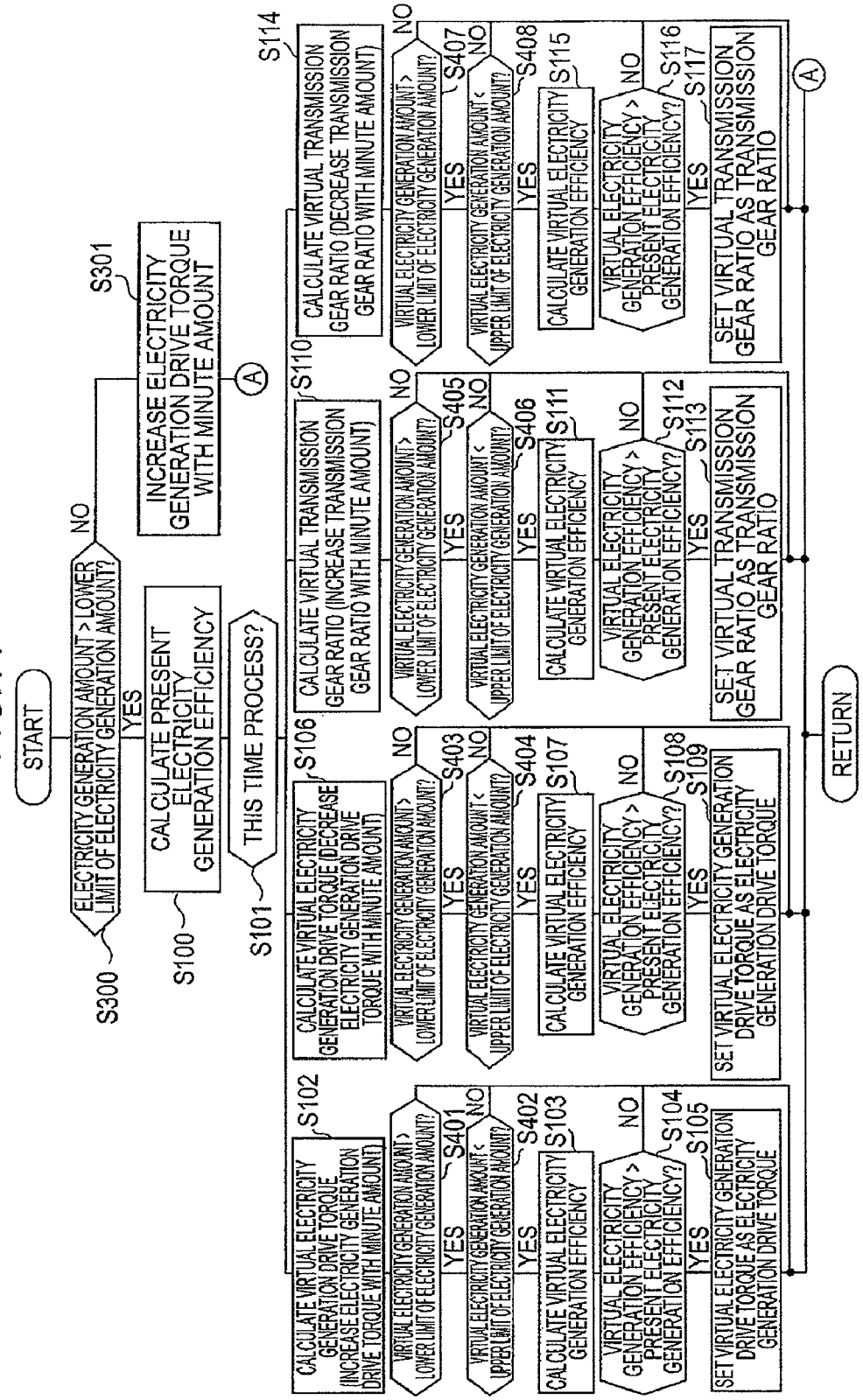
FIG. 14 is a flow chart illustrating an operation of an electricity generation control device according to an embodiment 5 of the invention.

Next, the operation of a controller 100 of the embodiment 5 will be described. FIG. 14 shows a flow chart illustrating the operation of the controller 100 of the embodiment 5. "A" parts of FIG. 14 connects to each other. The outline of the controller 100 of the embodiment 5 is substantially the same as that of the embodiment 3, such that the difference therebetween will be described. Mainly, it is different from the embodiment 3 in that a control state is not changed in a case where the electricity generation amount, at the time of virtually changing the control state with a minute amount, is not within the upper and lower limit.

The maximum value of the electricity generation amount is set to prevent the electrical storage unit mounted on a vehicle from being damaged due to excessive electricity generation. As an example, the maximum value of the electricity generation amount is set to a value of a tenth of the rating capacity in the electrical storage unit and it is stored in the controller 100 in advance.

First, in step S401 of FIG. 14, the virtual electricity generation amount is calculated from the virtual electricity generation drive torque Tg' and the virtual electricity generator rotation speed Ng' calculated in step S102 by using a table illustrating an electricity generation amount characteristic of an electricity generator characteristic as shown in FIG. 5. In a case where the virtual electricity generation amount is larger than the lower limit of the electricity generation amount, the process proceeds to step S402. In other cases, the process at this time is terminated. In step S402, in a case where the virtual electricity generation amount is smaller than the upper limit of the electricity generation amount, the process proceeds to step S103. In other cases, the process at this time is terminated.

In step S403 of FIG. 14, the virtual electricity generation amount is calculated from the virtual electricity generation drive torque Tg' and the virtual electricity generator rotation speed Ng' calculated in step S106 by using a table illustrating an electricity generation amount characteristic of an electricity generator characteristic as shown in FIG. 5. In a case where the virtual electricity generation amount is larger than the lower limit of the electricity generation amount, the process proceeds to step S404. In other cases, the process at this time is terminated. In step S404, in a case where the virtual electricity generation amount is smaller than the upper limit of the electricity generation amount, the process proceeds to step S107. Mother cases, the process at this time is terminated.

In step S405 of FIG. 14, the virtual electricity generation amount is calculated from the virtual electricity generation drive torque Tg' and the virtual electricity generator rotation speed Ng' calculated in step S110 by using a table illustrating an electricity generation amount characteristic of an electricity generator characteristic as shown in FIG. 5. In a case where the virtual electricity generation amount is larger than the lower limit of the electricity generation amount, the process proceeds to step S406. In other cases, the process at this time is terminated. In step S406, in a case where the virtual electricity generation amount is smaller than the upper limit of the electricity generation amount, the process proceeds to step S111. In other cases, the process at this time is terminated.

In step S407 of FIG. 14, the virtual electricity generation amount is calculated from the virtual electricity generation drive torque Tg' and the virtual electricity generator rotation speed Ng' calculated in step S114 by using a table illustrating an electricity generation amount characteristic of an electricity generator characteristic as shown in FIG. 5. In a case where the virtual electricity generation amount is larger than the lower limit of the electricity generation amount, the process proceeds to step S408. In other cases, the process at this time is terminated. In step S408, in a case where the virtual electricity generation amount is smaller than the upper limit of the electricity generation amount, the process proceeds to step S115. In other cases, the process at this time is terminated. Other operation is substantially the same as that of the embodiment 3.

According to the electricity generation control device of the embodiment 5, when it is compared with the embodiment 3, since the upper limit of the electricity generation amount is further set, it gradually approaches a state where the electricity generation efficiency becomes best within the upper and lower limit of the electricity generation amount, while preventing the situation where excessive electricity generation amount is present. Thereby, the electricity generation may be performed with a high efficiency.

Embodiment 6

In the embodiment 4, the lower limit is set, and at a point of time when an electricity generation becomes necessary, a control is performed to secure first a necessary electricity generation amount. As is the case with the embodiment 5, in the embodiment 6, the upper limit of the electricity generation amount is further set, the control is performed to search a state where the electricity generation amount becomes highest, while transitioning between the lower limit and the upper limit of the electricity generation amount.

The transition of each of the transmission gear ratio, the electricity generation drive torque and the electricity generation efficiency in a case of performing the electricity generation by the electricity generation control device according to the embodiment 6 is substantially the same as that of the embodiment 5 shown in FIG. 13.

Figure 15:
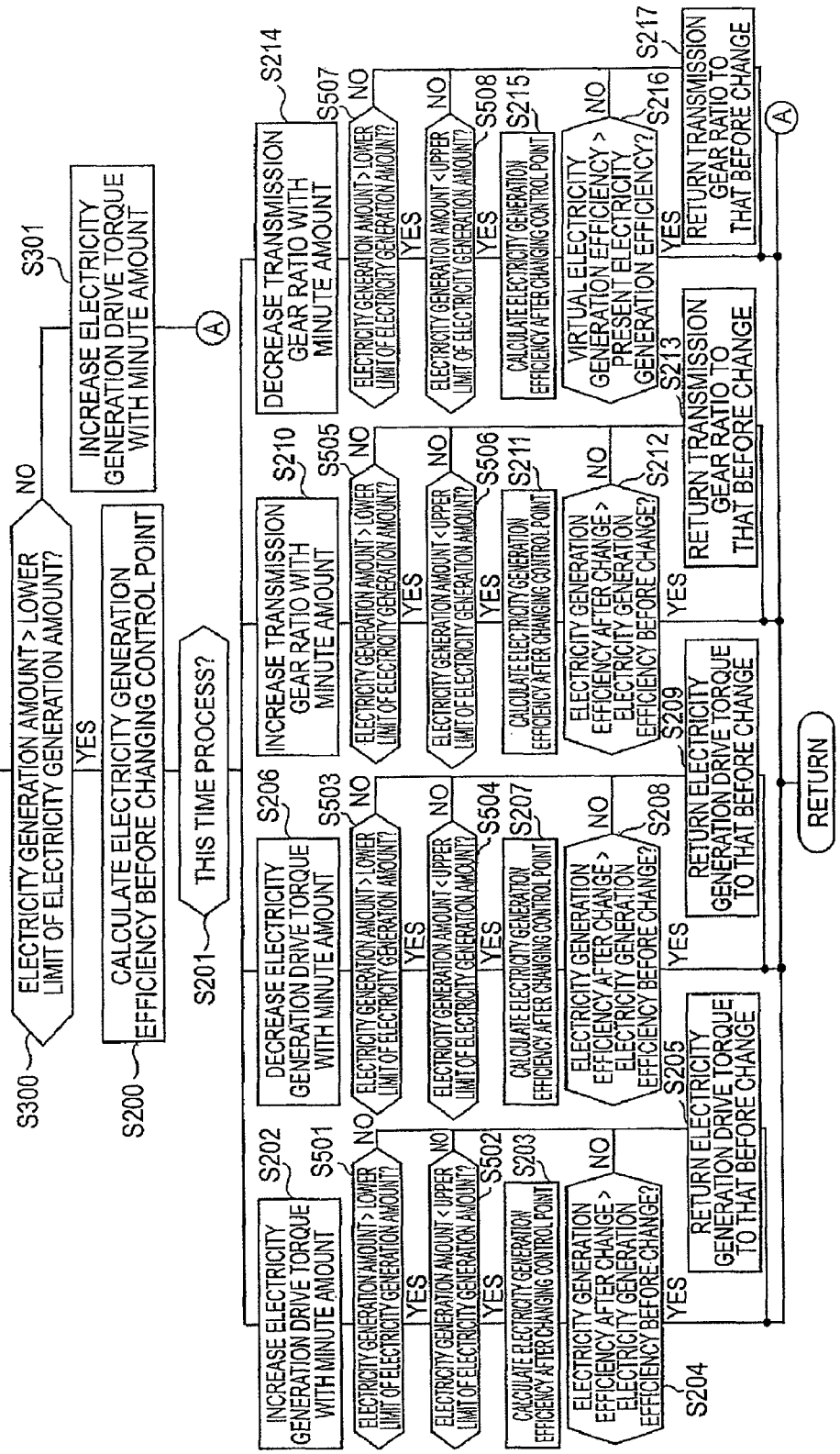
FIG. 15 is a flow chart illustrating an operation of an electricity generation control device according to an embodiment 6 of the invention.
Figure 16B:
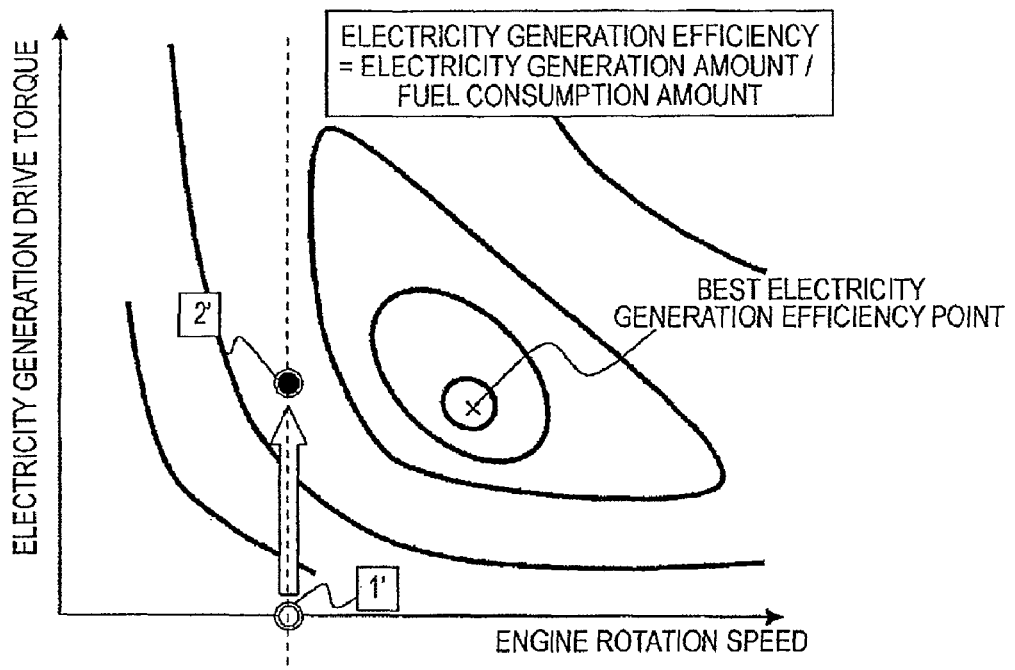
FIGS. 16A and 16B are graphs illustrating an engine efficiency and an electricity generation efficiency in an electricity generation control according to the related art.
Figure 16A:
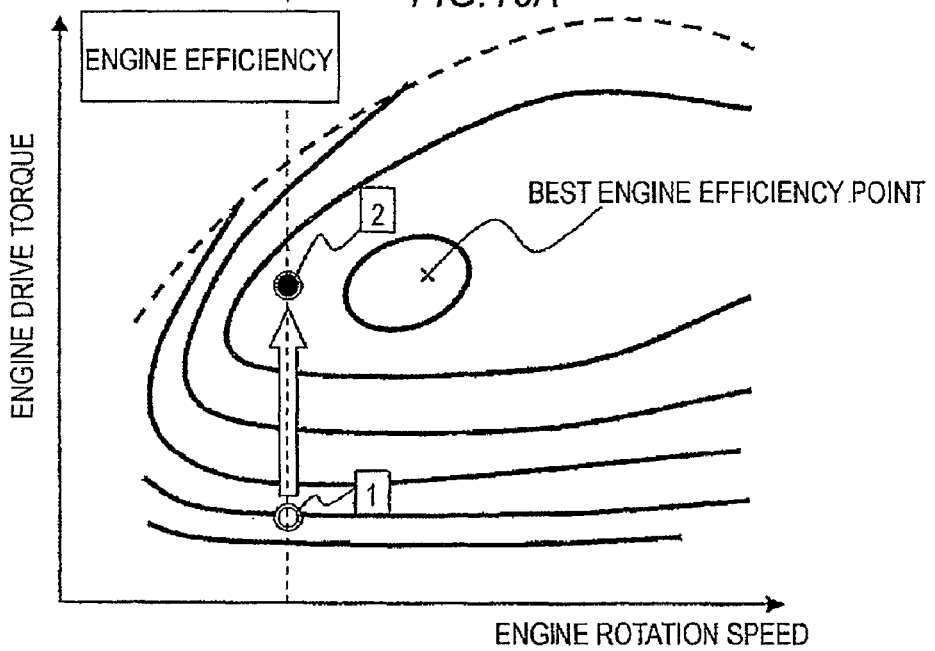
Figure 17:
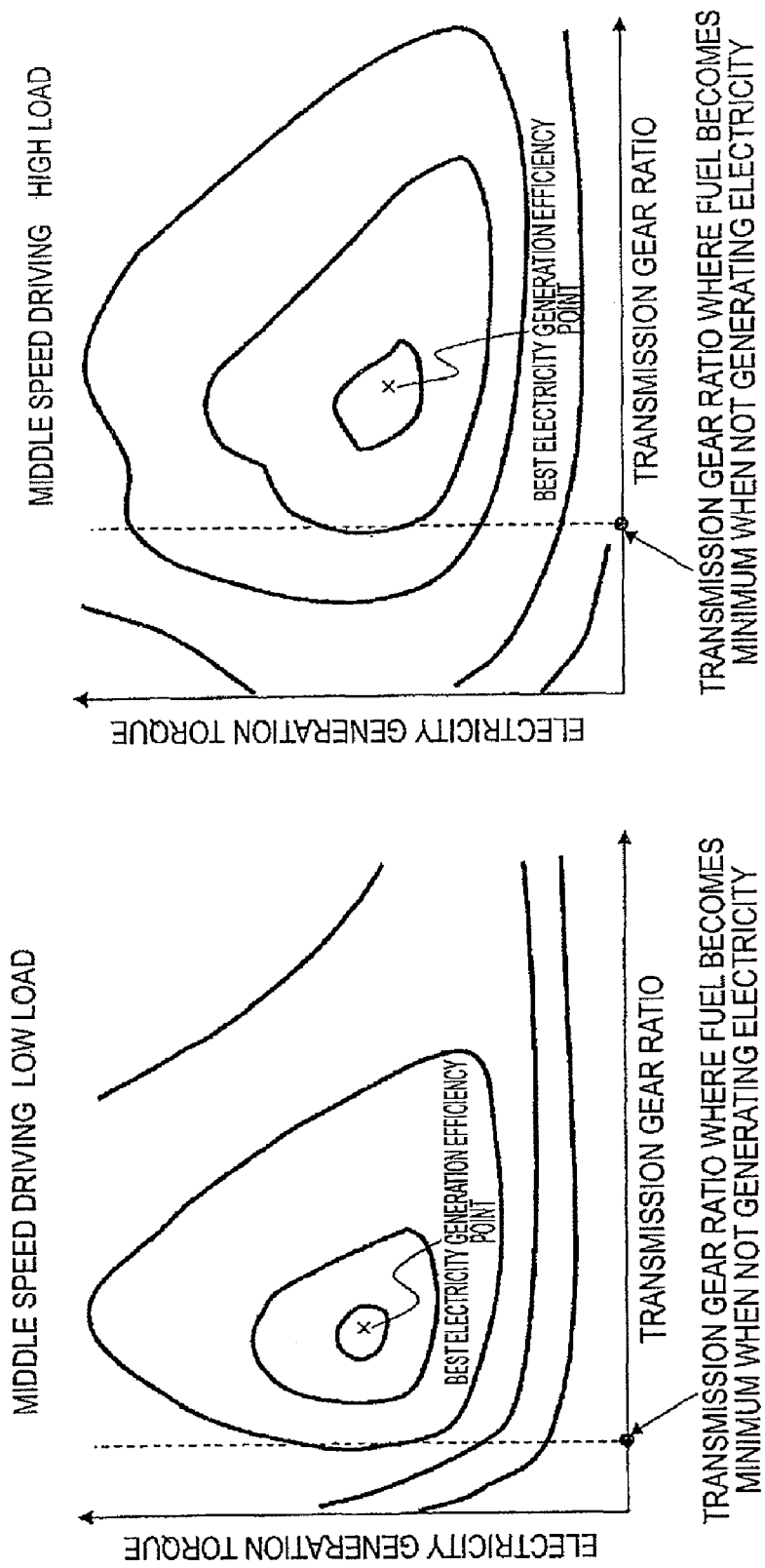
FIG. 17 is a diagram illustrating a difference in an electricity generation efficiency map in a case where each state of a vehicle is different, according to the related art.

Next, the operation of a controller 100 of the embodiment 6 will be described. FIG. 15 shows a flow chart illustrating the operation of the controller 100 of the embodiment 6. "A" parts of FIG. 15 connects to each other. The outline of the controller 100 of the embodiment 6 is substantially the same as that of the embodiment 4, such that the difference therebetween will be described. Mainly, it is different from the embodiment 4 in that an operation for returning the control state to that before the change is performed, in a case where the electricity generation amount is not within the upper and lower limit thereof.

First, in step S501 of FIG. 15, in a case where a detected electricity generation amount is larger than the lower limit of the electricity generation amount, the process proceeds to step S502. In other cases, the process proceeds to step S205. In step S502, in a case where the detected electricity generation amount is smaller than the upper limit of the electricity generation amount, the process proceeds to step S203. In other cases, the process proceeds to step S205.

In step S503 of FIG. 15, in a case where the detected electricity generation amount is larger than the lower limit of the electricity generation amount, the process proceeds to step S504. In other cases, the process proceeds to step S209. In step S504, in a case where the detected electricity generation amount is smaller than the upper limit of the electricity generation amount, the process proceeds to step S207. In other cases, the process proceeds to step S209.

In step S505 of FIG. 15, in a case where the detected electricity generation amount is larger than the lower limit of the electricity generation amount, the process proceeds to step S506. In other cases, the process proceeds to step S213. In step S506, in a case where the detected electricity generation amount is smaller than the upper limit of the electricity generation amount, the process proceeds to step S211. In other cases, the process proceeds to step S213.

In step S507 of FIG. 15, in a case where the detected electricity generation amount is larger than the lower limit of the electricity generation amount, the process proceeds to step S508. In other cases, the process proceeds to step S217. In step S508, in a case where the detected electricity generation amount is smaller than the upper limit of the electricity generation amount, the process proceeds to step S215. In other cases, the process proceeds to step S217. Other operations are substantially the same as that of the embodiment 4.

According to the electricity generation control device of the embodiment 6, when it is compared with the embodiment 4, since the upper limit of the electricity generation amount is further set, it gradually approaches a state where the electricity generation efficiency becomes best within the upper and lower limit of the electricity generation amount, while preventing the situation where an excessive electricity generation amount is present. Thereby, the electricity generation may be performed with a high efficiency.

In the aforementioned embodiments 1 and 2, the control amount determining unit 108 described in FIG. 2 and FIG. 8 operate as at least a transmission gear ratio changing unit and an electricity generation drive torque changing unit mentioned in the claims 1 and 2.

Various modifications and alternations of the invention will be apparent to those skilled in the art without departing from the scope and sprit of this invention, and it should be understood that this is not limited to the illustrative embodiment set forth herein.

What is claimed is:

1. An electricity generation control device, comprising:
an engine as a power source of a vehicle;
a continuously variable transmission that steplessly changes the power of the engine to transmit it to drive wheels of the vehicle;
an electricity generator that rotates following a drive shaft of the engine and can variably controls an electricity generation amount;
an electrical storage device that is charged by the electricity generator and supplies the charged power to electrical loads of the vehicle;
an engine rotation speed detecting unit that detects a rotation speed of the engine;
an engine drive torque control unit that controls a drive torque value of the engine;
an electricity generator rotation speed detecting unit that detects a rotation speed of the electricity generator;
an electricity generation drive torque control unit that controls a drive torque value of the electricity generator;
a fuel consumption amount calculating unit that calculates a fuel consumption amount from values of the engine rotation speed and the engine drive torque;
an electricity generation amount calculating unit that calculates an electricity generation amount of the electricity generator from values of the electricity generator rotation speed and the electricity generation drive torque;
a transmission gear ratio changing unit that, at a time of virtually changing a transmission gear ratio of the continuously variable transmission with a minute amount, calculates a virtual engine drive torque and a virtual engine rotation speed to maintain a present speed and a present driving force of the vehicle, calculates a virtual electricity generation efficiency from a virtual fuel consumption amount calculated from the virtual engine drive torque and the virtual engine rotation speed by the fuel consumption amount calculating unit and a virtual electricity generation amount calculated from the virtual engine rotation speed and the electricity generation drive torque by the electricity generation amount calculating unit, calculates a present electricity generation efficiency from a present fuel consumption amount and a present electricity generation amount, and changes the transmission gear ratio of the continuously variable transmission with the minute amount in a case where the virtual electricity generation efficiency is superior to the present electricity generation efficiency; and
an electricity generation drive torque changing unit that, at the time of virtually changing the engine drive torque or the electricity generation drive torque with a minute amount, calculates a virtual electricity generation efficiency from the virtual fuel consumption amount calculated by the fuel consumption amount calculating unit and the virtual electricity generation amount calculated by the electricity generation amount calculating unit, calculates a present electricity generation efficiency from a present fuel consumption amount and a present electricity generation efficiency, and changes the engine drive torque and the electricity generation drive torque with the minute amount, in a case where the virtual electricity generation efficiency is superior to the present electricity generation efficiency,
wherein the transmission gear changing unit and the electricity generation drive torque changing unit are alternately operated to perform the electricity generation.

2. An electricity generation control unit, comprising:
an engine as a power source of a vehicle;
a continuously variable transmission that steplessly changes the power of the engine to transmit it to drive wheels of the vehicle;
an electricity generator that rotates following a drive shaft of the engine and can variably controls an electricity generation amount;
an electrical storage device that is charged by the electricity generator and supplies the charged power to electrical loads of the vehicle;
an engine drive torque control unit that controls a drive torque value of the engine;

an electricity generation drive torque control unit that controls a drive torque value of the electricity generator;

a fuel consumption amount detecting unit that detects a fuel consumption amount of the engine;

an electricity generation amount detecting unit that detects an electricity generation amount;

a transmission gear ratio changing unit that changes a transmission gear ratio of the continuously variable transmission with a minute amount and at the same time changes an engine drive torque and an electricity generation drive torque to maintain a present speed and a present driving force of the vehicle, calculates an electricity generation efficiency from a fuel consumption amount and an electricity generation amount after changing the transmission gear ratio, and returns the transmission gear ratio of the continuously variable transmission to a state before the change in a case where the calculated electricity generation efficiency is inferior to the electricity generation efficiency calculated before changing the transmission gear ratio; and an electricity generation drive torque changing unit that changes the electricity generation drive torque with a minute amount and at the same time changes an engine drive torque to maintain a present speed and a present driving force of the vehicle, calculates an electricity generation efficiency from a fuel consumption amount and an electricity generation amount after changing the electricity generation drive torque, and returns the electricity generation drive torque to a state before the change in a case where the calculated electricity generation efficiency is inferior to the electricity generation efficiency before changing the electricity generation drive torque, wherein the transmission gear ratio changing unit and the electricity generation drive torque changing unit are alternately operated to perform the electricity generation.

3. The electricity generation control device according to claim 1, further comprising:

an electricity generation amount detecting unit that detects a present electricity generation amount; and an electricity generation amount setting unit that sets a lower limit of the electricity generation amount, wherein, in a case where the present electricity generation amount is smaller than the lower limit of the electricity generation amount, the electricity generation drive torque of the electricity generator increases and at the same time the engine drive torque increases to maintain a present speed and a present driving force of the vehicle.

4. The electricity generation control device according to claim 3, further comprising:

an upper limit electricity generation amount setting unit that sets an upper limit of the electricity generation amount, wherein, when the transmission gear ratio is changed with a minute amount by the transmission gear ratio changing unit, the transmission gear ratio changing unit is caused not to operate in a case where the electricity generation amount is smaller than the lower limit of the electricity generation amount or more than the upper limit of the electricity generation amount, and when the electricity generation drive torque is changed with a minute amount by the electricity generation drive torque changing unit, the electricity generation drive torque changing unit is caused not to operate in a case where the electricity generation amount is smaller than the lower limit of the electricity generation amount or more than the upper limit of the electricity generation amount.

5. The electricity generation control device according to claim 2, further comprising:

an electricity generation amount detecting unit that detects a present electricity generation amount; and an electricity generation amount setting unit that sets a lower limit of the electricity generation amount, wherein, in a case where the present electricity generation amount is smaller than the lower limit of the electricity generation amount, the electricity generation drive torque of the electricity generator increases and at the same time the engine drive torque increases to maintain a present speed and a present driving force of the vehicle.

6. The electricity generation control device according to claim 5, further comprising:

an upper limit electricity generation amount setting unit that sets an upper limit of the electricity generation amount, wherein, when the transmission gear ratio is changed with a minute amount by the transmission gear ratio changing unit, the transmission gear ratio changing unit is caused not to operate in a case where the electricity generation amount is smaller than the lower limit of the electricity generation amount or more than the upper limit of the electricity generation amount, and when the electricity generation drive torque is changed with a minute amount by the electricity generation drive torque changing unit, the electricity generation drive torque changing unit is caused not to operate in a case where the electricity generation amount is smaller than the lower limit of the electricity generation amount or more than the upper limit of the electricity generation amount.

* * * * *